(12) United States Patent
O'Dowd et al.

(10) Patent No.: US 12,287,287 B2
(45) Date of Patent: Apr. 29, 2025

(54) PORE MEASUREMENT DEVICE

(71) Applicant: The Regents of the University of California, Oakland, CA (US)

(72) Inventors: Niall O'Dowd, San Diego, CA (US); Michael Todd, San Diego, CA (US)

(73) Assignee: The Regents Of the University of California, Oakland, CA (US)

( * ) Notice: Subject to any disclaimer, the term of this patent is extended or adjusted under 35 U.S.C. 154(b) by 248 days.

(21) Appl. No.: 17/775,530

(22) PCT Filed: Nov. 12, 2020

(86) PCT No.: PCT/US2020/060291
§ 371 (c)(1),
(2) Date: May 9, 2022

(87) PCT Pub. No.: WO2021/097134
PCT Pub. Date: May 20, 2021

(65) Prior Publication Data
US 2022/0404276 A1    Dec. 22, 2022

Related U.S. Application Data

(60) Provisional application No. 63/092,285, filed on Oct. 15, 2020, provisional application No. 63/045,699, (Continued)

(51) Int. Cl.
    *G01N 21/45*      (2006.01)
    *G01B 11/06*      (2006.01)
    *G01N 21/88*      (2006.01)

(52) U.S. Cl.
    CPC ......... *G01N 21/45* (2013.01); *G01B 11/0616* (2013.01); *G01N 21/8806* (2013.01); (Continued)

(58) Field of Classification Search
CPC .............. G01N 21/8806; G01N 21/45; G01N 2021/456; G01N 2021/8829; G01B 11/0616

See application file for complete search history.

(56) References Cited

U.S. PATENT DOCUMENTS 5,995,245 A * 11/1999 Moro ................. H04N 1/02409
                                      358/497
2004/0184648 A1   9/2004 Zhang et al.
(Continued)

OTHER PUBLICATIONS

Hu et al."A Method For Measuring Water Surface Target", Apr. 1, 2015, CN 104482921 A. (Year: 2015).*
(Continued)

*Primary Examiner* — Sang H Nguyen
(74) *Attorney, Agent, or Firm* — Mintz, Levin, Cohn, Ferris, Glovsky and Popeo, P.C.

(57) ABSTRACT

In one aspect, there is provided a system including at least one processor, and at least one memory including program code which when executed by the at least one processor causes operations including capturing an image of at least a portion of a surface of an object; generating, from the captured image, pixel intensity data; in response to generating the pixel intensity data, determining, based on a height error model, height error data, wherein the height error data indicates an uncertainty of at least one height measurement of the object; and determining, based on the height error data, whether the object satisfies a threshold criteria for acceptance of the object. Related system, methods, and articles of manufacture are also disclosed.

19 Claims, 13 Drawing Sheets

Related U.S. Application Data filed on Jun. 29, 2020, provisional application No. 62/934,885, filed on Nov. 13, 2019.

(52) U.S. Cl.
CPC .................. *G01N 2021/456* (2013.01); *G01N 2021/8829* (2013.01)

(56) References Cited

U.S. PATENT DOCUMENTS

| | | | | |
|---|---|---|---|---|
| 2005/0284937 | A1* | 12/2005 | Xi | G05B 19/4083 235/437 |
| 2012/0127486 | A1* | 5/2012 | Kim | G01B 11/2531 356/630 |
| 2013/0010107 | A1* | 1/2013 | Suzuki | G01B 11/0608 348/136 |
| 2014/0347473 | A1* | 11/2014 | Wolff | G06T 5/77 348/135 |
| 2017/0016715 | A1* | 1/2017 | Heidrich | G06T 7/0004 |
| 2017/0241767 | A1* | 8/2017 | Miyata | G06T 7/73 |
| 2018/0141278 | A1* | 5/2018 | Adzima | B33Y 10/00 |
| 2019/0054700 | A1* | 2/2019 | Chandar | G06F 17/18 |
| 2019/0195621 | A1* | 6/2019 | Ogawa | G01B 11/25 |
| 2019/0304851 | A1 | 10/2019 | Smith et al. | |

OTHER PUBLICATIONS

Aboulkhair, N. T. et al., "Improving the fatigue behaviour of a selectively laser melted aluminium alloy: Influence of heat treatment and surface quality," Mater. Des., vol. 104, pp. 174-182, 2016.
Attar, H. et al., "Manufacture by selective laser melting and mechanical behavior of commercially pure titanium," Mater. Sci. Eng. A, vol. 593, pp. 170-177, 2014.
|Baker, M. J. et al., "Elimination of non-linear luminance effects for digital video projection phase measuring profilometers," in 4th IEEE international symposium on electronic design, test and applications (delta 2008), pp. 496-501, IEEE, 2008.
Brandt, M. et al., "High-value SLM aerospace components: from design to manufacture," in Advanced Materials Research, 2013, vol. 633, pp. 135-147.
Brooks, R. E. et al., "Moire gauging using optical interference patterns," Applied Optics, vol. 8, No. 5, pp. 935-939, 1969.
Chen, C. et al., "Generic exponential fringe model for alleviating phase error in phase measuring profilometry," Optics and Lasers in Engineering, vol. 110, pp. 179-185, 2018.
Chen, L.-C. et al., "Calibration of 3D surface profilometry using digital fringe projection," Measurement Science and Technology, vol. 16, No. 8, p. 1554, 2005.
"Chess Board Opencv Correct Lens Distortions Calibration Plate (available at https://spwindustrial.com/chess-board-opencv-correct-lens-distortions-calibration-plate-stage-3-x-3mm/?gclid=CjwKCAjwlPTmBRBoEiwAHqpvhazvDHZhhMSDD86VRKHK2lhelrp-n7aCHS2DOWJBp7EkMOcwAcWXpxoC_RoQAvD_BWE".
Clijsters, S. et al., "In situ quality control of the selective laser melting process using a high-speed, real-time melt pool monitoring system," Int. J. Adv. Manuf. Technol., 2014.
Craeghs, T. et al., "Online quality control of selective laser melting," in Proceedings of the Solid Freeform Fabrication Symposium, Austin, TX, 2011, pp. 212-226.
Deng, J. et al., "Studies of different error elimination algorithms under defocusing digital fringe projection," in Seventh International Symposium on Precision Mechanical Measurements, vol. 9903, p. 99032Q, International Society for Optics and Photonics, 2016.
Depond, P. J. et al., "In situ measurements of layer roughness during laser powder bed fusion additive manufacturing using low coherence scanning interferometry," Mater. Des., vol. 154, pp. 347-359, 2018.
Dhanasekar, B. et al., "Digital speckle interferometry for assessment of surface roughness," Optics and Lasers in Engineering, 46(3), 272-280 (2008).

Ennos, A. E. "Measurement of in-plane surface strain by hologram interferometry," Journal of Physics E: Scientific Instruments, vol. 1, No. 7, p. 731, 1968.
Ernst, R. et al., "Local wall thickness measurement of formed sheet metal using fringe projection technique," in XVII IMEKO World Congress, Metrology in the 3rd Millennium. Croatia, pp. 1802-1805, Citeseer, 2003.
Gasvik, K. J. "Moire technique by means of digital image processing," Applied Optics, vol. 22, No. 22, pp. 3543-3548, 1983.
Genovese, K. et al., "Whole 3D shape reconstruction of vascular segments under pressure via fringe projection techniques," Optics and Lasers in Engineering, vol. 44, No. 12, pp. 1311-1323, 2006.
Gorthi, S. S et al., "Fringe projection techniques: whither we are?," Optics and Lasers in Engineering, vol. 48, No. IMAC-REVIEW-2009-001, pp. 133-140, 2010.
Guo, H. et al., "Gamma correction for digital fringe projection profilometry," Applied Optics, vol. 43, No. 14, pp. 2906-2914, 2004.
Halioua, M. et al., "Optical three-dimensional sensing by phase measuring profilometry," Optics and Lasers in Engineering, vol. 11, No. 3, pp. 185-215, 1989.
He, X. Y. et al., "Static and dynamic deformation measurements of micro beams by the technique of digital image correlation," in Key Engineering Materials, vol. 326, pp. 211-214, 2006.
Hoang, T. et al., "Generic gamma correction for accuracy enhancement in fringe-projection profilometry," Optics Letters, vol. 35, No. 12, pp. 1992-1994, 2010.
Hu, Y. et al., "Study on generalized analysis model for fringe pattern profilometry," IEEE Transactions on Instrumentation and Measurement, vol. 57, No. 1, pp. 160-167, 2007.
Huang, P. S et al., "Double three-step phase-shifting algorithm," Applied optics, vol. 41, No. 22, pp. 4503-4509, 2002.
Huang, P. S et al., "Quantitative evaluation of corrosion by a digital fringe projection technique," Optics and Lasers in Engineering, vol. 31, No. 5, pp. 371-380, 1999.
Jain, A. K. "Fundamentals of Digital Image Processing," Englewood Cliffs, NJ: Prentice Hall, 1989.
Jang, P.-R. "Quantitative imaging characterization of aluminum pit corrosion in Oak Ridge research reactor pool," in Advanced Environmental, Chemical, and Biological Sensing Technologies IV, vol. 6377, p. 63770S, International Society for Optics and Photonics, 2006.
Kai, Y. C. et al., "Compensation of gamma effect and color cross talk in color-coded fringe profilometry," Journal of Electronic Imaging, vol. 29, No. 2, p. 23021, 2020.
Kamagara, A. et al., "Nonlinear gamma correction via normed bicoherence minimization in optical fringe projection metrology," Optical Engineering, vol. 57, No. 3, p. 34107, 2018.
Kanko, J. A. et al. "In situ morphology-based defect detection of selective laser melting through inline coherent imaging," Journal of Materials Processing Technology, 231, 488-500 (2016).
Kasperovich, G. et al., "Improvement of fatigue resistance and ductility of TiAl6V4 processed by selective laser melting," J. Mater. Process. Technol., vol. 220, pp. 202-214, 2015.
Kruth, J.-P. et al., "Feedback control of selective laser melting," in Proceedings of the 3rd international conference on advanced research in virtual and rapid prototyping, 2007, pp. 521-527.
Land II, W. S et al., "In-situ metrology system for laser powder bed fusion additive process," Procedia Manuf., vol. 1, pp. 393-403, 2015.
Leger, D. et al., "Real-time measurement of surface roughness by correlation of speckle patterns," Journal of Optical Society of America, vol. 66, No. 11, pp. 1210-1217, 1976.
Lei, S. et al., "Flexible 3-D shape measurement using projector defocusing," Optics letters, vol. 34, No. 20, pp. 3080-3082, 2009.
Lei, Z. et al., "Multi-frequency inverse-phase fringe projection profilometry for nonlinear phase error compensation," Optics and Lasers in Engineering, vol. 66, pp. 249-257, 2015.
Leuders, S. et al., "On the mechanical behaviour of titanium alloy TiAl6V4 manufactured by selective laser melting: Fatigue resistance and crack growth performance," Int. J. Fatigue, vol. 48, pp. 300-307, 2013.

(56) References Cited

OTHER PUBLICATIONS

Li, Y. et al., "On bit-depth of pattern in three-dimensional measurement system based on digital fringe projection," in International Conference on Optical and Photonics Engineering (icOPEN 2016), vol. 10250, p. 1025018, International Society for Optics and Photonics, 2017.
Lilley, F. et al., "Robust fringe analysis system for human body shape measurement," Optical Engineering, vol. 39, pp. 187-195, 2000.
Lott, P. et al., "Design of an optical system for the in situ process monitoring of selective laser melting (SLM)," Phys. Procedia, vol. 12, pp. 683-690, 2011.
Ma, S. et al., "A fast and accurate gamma correction based on Fourier spectrum analysis for digital fringe projection profilometry," Optics Communications, vol. 285, No. 5, pp. 533-538, 2012.
Maack, T. et al., "Camera influence on the phase-measurement accuracy of a phaseshifting speckle interferometer," Applied optics, vol. 35, No. 19, pp. 3514-3524, 1996.
Molimard, J. et al., "Uncertainty on fringe projection technique: A Monte-Carlo-based approach," Optics and Lasers in Engineering, vol. 51, No. 7, pp. 840-847, 2013.
Moore, C. J. et al., "3D body surface measurement and display in radiotherapy part I: Technology of structured light surface sensing," in International Conference on Medical Information Visualisation-BioMedical Visualisation (MedVis' 06), pp. 97-102, IEEE, 2006.
Neef, A. et al., "Low coherence interferometry in selective laser melting," Phys. Procedia, vol. 56, pp. 82-89, 2014.
Notni, G. H. et al., "Digital fringe projection in 3D shape measurement: an error analysis," in Optical Measurement Systems for Industrial Inspection III, vol. 5144, pp. 372-380, International Society for Optics and Photonics, 2003.
Pan, B. et al., "Fast, robust and accurate digital image correlation calculation without redundant computations," Experimental Mechanics, vol. 53, No. 7, pp. 1277-1289, 2013.
Pan, J. et al., "Color-coded binary fringe projection technique for 3-D shape measurement," Optical Engineering, vol. 44, No. 2, p. 23606, 2005.
Quan, C. et al., "Microscopic surface contouring by fringe projection method," Optics and Laser Technology, vol. 34, No. 7, pp. 547-552, 2002.
Samara, A. M. "Enhanced dynamic range fringe projection for micro-structure characterization," (2006).
Sciammarella, C. A. et al., "General model for moire contouring, part 1: theory," Optical Engineering, vol. 47, No. 3, p. 33605, 2008.
Sciammarella, C. A. et al., "General model for moire contouring, part 2: applications," Optical Engineering, vol. 47, No. 3, p. 33606, 2008.
Sciammarella, C. A. et al., "High precision contouring with moire and related methods: a review," Strain, vol. 47, pp. 43-64, 2011.
Slotwinski, J. A. et al., "Porosity measurements and analysis for metal additive manufacturing process control," J. Res. Natl. Inst. Stand. Technol., vol. 119, p. 494, 2014.
Smith, R. J. et al., "Spatially resolved acoustic spectroscopy for selective laser melting," Journal of Materials Processing Technology, vol. 236, pp. 93-102 (2016).
Su, X.-Y. et al., "Automated phase-measuring profilometry using defocused projection of a Ronchi grating," Optics Communications, vol. 94, No. 6, pp. 561-573, 1992.
Takamatsu, J. et al., "Estimating camera response functions using probabilistic intensity similarity," in 2008 IEEE Conference on Computer Vision and Pattern Recognition, pp. 1-8, IEEE, 2008.
Wu, G. et al., "Exponential Taylor Series Method to eliminate the gamma distortion in phase shifting profilometry," Optics Communications, vol. 452, pp. 306-312, 2019.
Zhang, B. et al., "In situ surface topography of laser powder bed fusion using fringe projection," Addit. Manuf., vol. 12, pp. 100-107, 2016.
Zhang, S. "High-Speed 3D imaging with digital fringe projection techniques," CRC Press, 2016.
Zhang, S. et al., "Novel method for structured light system calibration," Opt. Eng., vol. 45, No. 8, p. 83601, 2006.
Zi-Xin, X. U. et al., "Removing harmonic distortion of measurements of a defocusing three-step phase-shifting digital fringe projection system," Optics and Lasers in Engineering, vol. 90, pp. 139-145, 2017.

\* cited by examiner

Pixel intensity uncertainty distribution

Phase uncertainty distribution

Height uncertaity distribution

200

Perform a measurement of at least a portion of a surface of an object  205

Generate a pixel intensity distribution  210

Generate, based on a distribution of phase noise in the pixel intensity distribution, a height error distribution  215

Determine whether to reject the object based on the height error distribution  220

FIG. 2

PORE MEASUREMENT DEVICE

CROSS REFERENCE TO RELATED APPLICATIONS

This application is a national stage entry of Patent Cooperation Treaty Application No. PCT/US2020/060291 filed Nov. 12, 2020, entitled "PORE MEASUREMENT DEVICE," which claims priority to U.S. Provisional Patent Application No. 62/934,885, filed on Nov. 13, 2019, and entitled "PORE MEASUREMENT DEVICE," and also claims priority to U.S. Provisional Patent Application No. 63/045,699, filed on Jun. 29, 2020, and entitled "PORE MEASUREMENT DEVICE," and claims priority to U.S. Provisional Patent Application No. 63/092,285, filed on Oct. 15, 2020, and entitled "PORE MEASUREMENT DEVICE," the disclosures of all three applications are incorporated herein by reference in their entirety.

STATEMENT OF GOVERNMENT SUPPORT

This invention was made with government support under Los Alamos National Lab, Managed by Triad National Security, LLC for the U.S. Department of Energy's National Nuclear Security Administration (NNSA). The government has certain rights in the invention.

BACKGROUND

Digital fringe projection (DFP) refers to a non-contact surface measurement technique that may be used in, for example, surface height profiling, surface roughness quantification, and three-dimensional point cloud creation, and/or the like. In the case of DFP, structured light, such as a fringe, is projected on to the surface of an object. A sensor captures an image and determines a height measurement. In the case of additive manufacturing, DFP may be used to measure the height of material being added to form the object. For example, after a layer of powder is applied to an object, DFP may be used to measure the height of the applied layer.

SUMMARY

In one aspect, there is provided a system including at least one processor; and at least one memory including program code which when executed by the at least one processor causes operations including capturing an image of at least a portion of a surface of an object; generating, from the captured image, pixel intensity data; in response to generating the pixel intensity data, determining, based on a height error model, height error data, wherein the height error data indicates an uncertainty of at least one height measurement of the object; and determining, based on the height error data, whether the object satisfies a threshold criteria for acceptance of the object.

In some variations, one or more of the features disclosed herein including the following features can optionally be included in any feasible combination. The system may further include an image sensor configured to capture the image and a light source configured to project structured light on to the surface of the object. The structured light may include a Moiré pattern and/or a fringe pattern. The height error model may be determined based on noise captured by the image associated with the pixel intensity data. The noise may include uncertainty caused by light projector gamma nonlinearity, light projector quantization, camera quantization, and/or pixel intensity noise caused by ambient light. In response to the generating of the pixel intensity data, at least one height measurement of the object may be determined. The determination may include determining whether the object satisfies the threshold criteria further comprises determining whether the object satisfies a threshold height. In response to the at least one height measurement exceeding a threshold height, an indication to reject the object may be provided based on the height error data indicating a threshold level of certainty. The indication may terminate an additive manufacturing process of the part. The indication may trigger an alert at a user interface. The indication may trigger an alert to dispose of, rather than reuse, material being used to build the object. The system may comprise, or be comprised in, an additive manufacturing device making the object. After a layer of material is applied, the processor causes the capturing, the generating, the determining height error data, and/or determining whether the object satisfies the threshold. The additive manufacturing device may include powder fusion, binder jetting, and/or direct energy deposition. In response to the at least one height measurement being less than a threshold height, an indication to continue or restart additive manufacturing of the object may be provided based on the height error data indicating a threshold level of certainty. Moreover, an aggregate layer height and an aggregate height error for a plurality of layers of material applied to the object may be provided. Furthermore, feedback may be provided to adjust one or more parameters of an additive manufacturing process of the object.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1D depicts an example of a height uncertainty distribution, in accordance with some example embodiments;

FIG. 2 depicts an example of a process for determining a height uncertainty, in accordance with some example embodiments;

DETAILED DESCRIPTION

As the commercial availability of high accuracy light projectors and digital cameras increases, DFP as well as other optical measurement technologies will continue to become more prevalent for critical engineering applications drawn from biomedical, materials science, electronics inspection domains, and/or the like. When these DFP-based measurements are used to inform decisions regarding the acceptance, maintenance, or usage of an object, such as a part other type of object, there may also be a need for an understanding and quantification of the uncertainties in the DFP measurement process. There is a variety of sources of measurement uncertainty in the DFP measurement process, and these uncertainties represent errors in measurements. The sources of the uncertainties include light projector gamma nonlinearity, light projector and camera quantization effects, and pixel intensity noise, and/or the like. In the case of pixel intensity noise, it is considered a major source of uncertainty in DFP including DFP height measurements.

In some example embodiments, there is provided a model that quantifies measurement uncertainty associated with DFP measurements including DFP height measurements. In some example embodiments, the model (which quantifies measurement uncertainty) may be determined based on the pixel intensity noise associated with DFP measurements including DFP height measurements.

In some example embodiments, the model takes, as an input, pixel intensity data and provides, as an output, height measurement uncertainty. For example, the pixel intensity may be captured by an image sensor, such as a camera, imaging structured light, such as a fringe, that is projected on the surface of an object being measured. The output height measurement uncertainty provides an indication of the uncertainty (e.g., noise, confidence, error, etc.) for a given DFP height measurement of the object. To illustrate further, given a height measurement on the surface of an object, the height measurement uncertainty may be used to determine whether at least a portion of a powder layer applied on the object exceeds a threshold height and the uncertainty (or confidence) of that height measurement. The confidence of the height measurement may thus be determined based on the height measurement uncertainty provided as an output of the model, in accordance with some example embodiments.

Although some of the examples described herein refer to using the model to quantify the uncertainty of DFP height measurements, the error model may be used to provide an indication of the uncertainty associated with other types of optical or light based measurement technologies as well including digital image correlation technology, contact scanner technology, coherent light imaging technology, and the like.

Figure 1A:
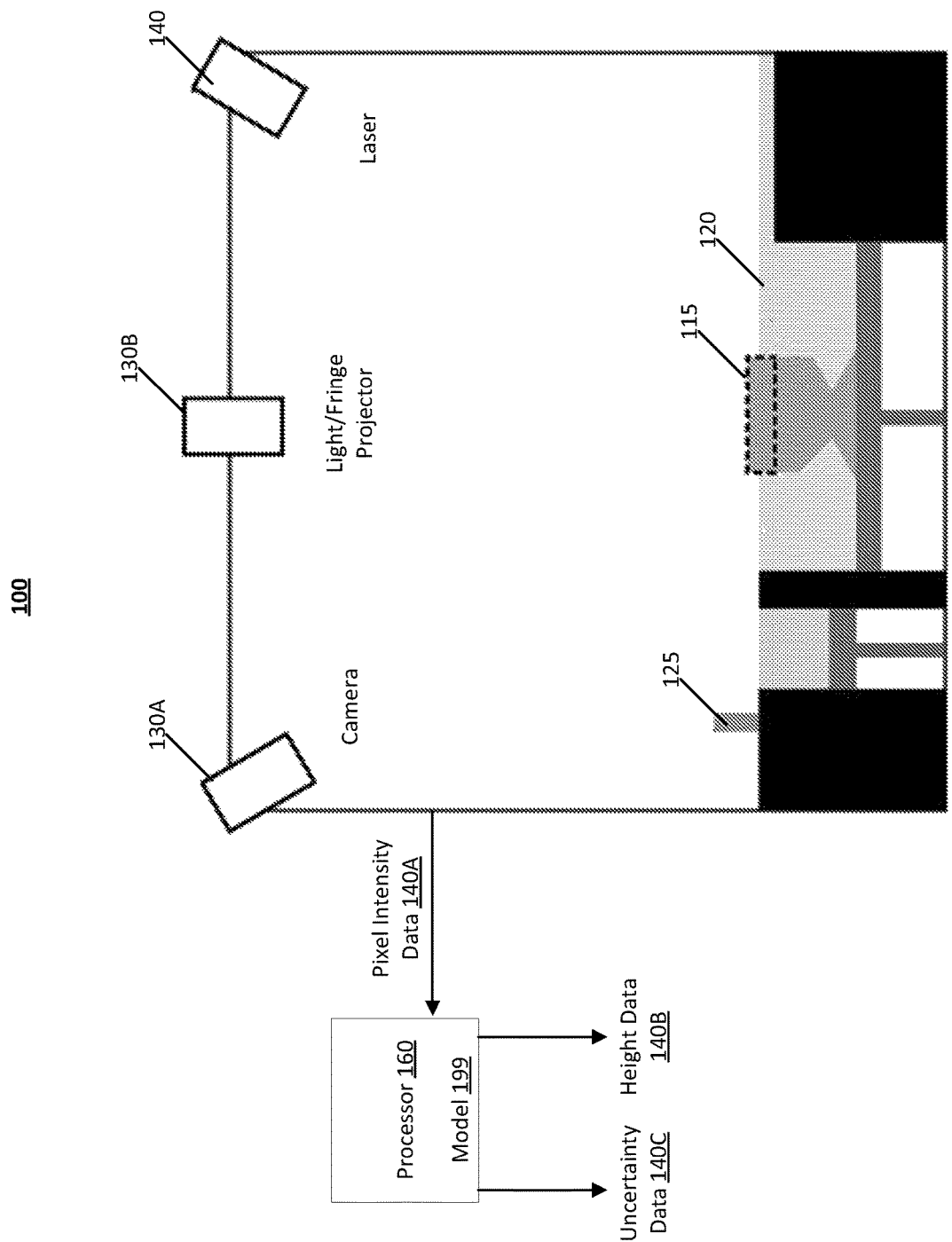
FIG. 1A depicts an example of an additive manufacturing system, in accordance with some example embodiments.

FIG. 1A depicts an example of an additive manufacturing system 100, in accordance with some example embodiments. The system may include an object 115 that is undergoing additive manufacturing, material 120 such as unfused additive manufacturing powder (e.g., a metal based powered), a recoater blade 125 configured to layer application of the material to the object, one or more devices 130A-B, a heat source such as a laser 140, and a processor 160. The first device 130A may correspond to an imaging sensor, such as camera, configured to capture an image of a digital fringe that is projected on the object by the second device 130B, such as a light source, projector, and/or the like. Although FIG. 1A depicts the sensor 130A and projector 130B at certain locations within the additive manufacturing system, those devices 130A-B may be placed in other locations as well. Moreover, the devices 130A-B may comprise a plurality of cameras, projectors, and/or interferometers. As used herein an additive manufacturing device (or system) refers to construction of an object, such as 3D printing technology, binder jetting, powder bed fusion, direct energy deposition, and/or other technologies.

Figure 1B:
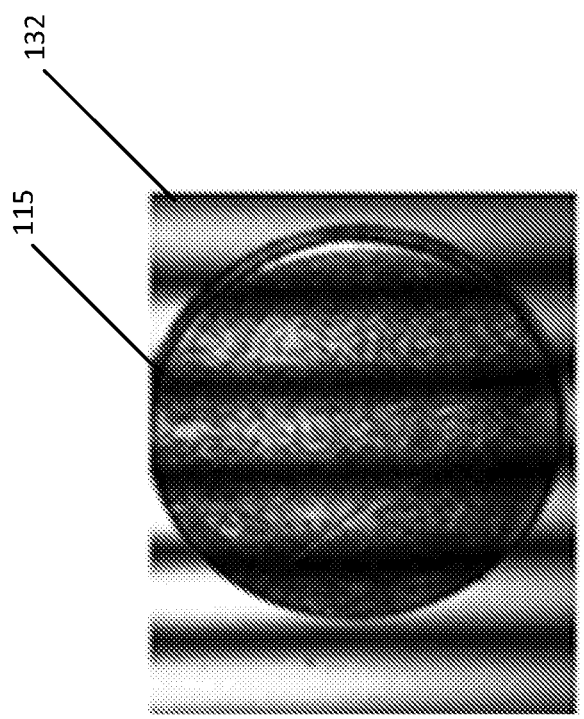
FIG. 1B depicts an example of structured light, such as a fringe, projected on an object, in accordance with some example embodiments.

In operations, the recoater blade 125 moves across the surface of the object 115 to apply a layer of the material 120 on the object 115. The light source 130B may project light on the object, while the imaging sensor 130A, performs a measurement by capturing an image of at least a portion of the surface of the object (which includes a fringe projection on the surface). For example, the light source 130B may project a fringe on the surface of the object 115. FIG. 1B depicts an example of a fringe 132 projected on the object 115 as well as a reference surface on which the object sits. Although the fringe 132 depicted at FIG. 1B is a Moiré pattern, other patterns or types of fringes or structured light may be used as well.

The processor 160 may receive and process the measurement to determine height data for the powder applied to the object 115 and/or uncertainty data related to the height measurement, in accordance with some example embodiments. In some example embodiments, the processor 160 may receive from the camera 130A pixel data representative of the intensity of the pixels on at least the surface of the object (referred to as pixel intensity data 140A). The processor may output data, such as height measurement data 140B, for the height of the powder applied on the object, and/or may output uncertainty data 140C that indicates the uncertainty associated with the height measurement data 140B. In some example embodiments, the processor includes a model 199 that provides the height measurement data and/or the uncertainty data based on the pixel intensity data.

After a layer of powder is applied to the object for example, the laser 140 may heat or sinter the applied layer of powder. This process may repeat by having the recoater 125 apply another layer of material, perform measurements, determine the height and height uncertainty of the applied layer, sinter, and so forth until the object is complete. In this example, each layer of applied powder may have a corresponding height measurement performed by capturing an image of at least a portion of the surface of the object and processing the measurement to determine the height of the power applied to the object. In some example embodiments, there may be provided layer-by-layer measurements using structured light-based system, such as system 100. The measurements may be used to determine a height profile of each layer, uniformity of powder distribution (e.g., the existence of a void or chunk in a powder layer), porosity of an applied layer, and/or other types of measurements. Although the previous example describes capturing an image of the layer before sintering, the image may be captured before and/or after the layer is sintered to provide height measurements and uncertainty of the layer before and after the layer is sintered.

The height measurement may represent a plurality of height measurements on the surface of the object under test, which in this example is object 115 undergoing additive manufacturing. As noted, the height measurements may be used to determine whether the object is defective if, for example, a height measurement of the object indicates that the applied material 120 resulted in too much (or too little) material being applied to at least a portion of the object. Because there are uncertainties associated with the height measurements, the system 100 may provide uncertainty data to provide an indication of the confidence (for example, certainty) of a given measurement. Referring to the previous example, if the height measurement is over a threshold height and the uncertainty data indicates the height measurement has a confidence of 99% of being accurate (or over a threshold amount of certainty), the part may be marked by system 100 as defective.

The model 199 may determine the height measurement uncertainty based on noise associated with the pixel intensity. This pixel intensity noise may, as noted, represent a substantial portion of the noise and, thus, uncertainty associated with DFP measurements and, in particular, DFP height measurements as well as other types of optical or light based measurement technologies. For example, when the image captures the measurement, the pixel data associated with the image captures the noise of the measurement including light projector gamma nonlinearity, light projector and camera quantization effects, and pixel intensity noise caused by ambient light, and/or the like. Moreover, the model 199 may determine the height measurement uncertainty by removing a noise free uncertainty distribution from a noisy uncertainty distribution (which results in an estimate of the noise, such as the uncertainty or error of the height measurements).

In some example embodiments, there is provided the model 199 may be configured to quantify the uncertainty, such as error, noise, and/or the like, associated with height measurements performed using a light or optical based technology, such as DFP. The model may provide the height measurement uncertainty as a distribution of uncertainty for one or more height measurements performed on the object 115.

Figure 1C:
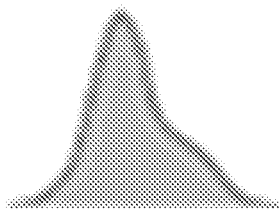
FIG. 1C depicts an example of a pixel uncertainty distribution, in accordance with some example embodiments.
Figure 1D:
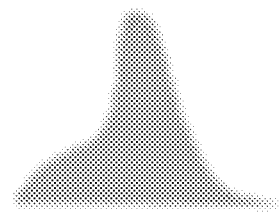
FIG. 1D depicts an example of a phase uncertainty distribution, in accordance with some example embodiments.

In some example embodiments, the model, such as model 199, may receive an input including a distribution of pixel intensity data. This pixel intensity data may be received from an image source, such as a camera, performing a measurement (e.g., image capture) of the fringe or structured light on the object 115. In some example embodiments, the model outputs a distribution of the uncertainty of the measurements. FIG. 1C depicts an example of the output, which in this example is a pixel intensity uncertainty distribution. In the example of FIG. 1C, the distribution of pixel intensities represents the uncertainty of the pixel data captured by an imaging sensor, such as a camera 130A, imaging the fringe light pattern projected on the surface of the object 115. From the input distribution of pixel intensity data, the model 199 may generate a phase uncertainty distribution (or probability density function of phase uncertainty as a function of the distribution of pixel intensities). FIG. 1D depicts an example of the phase uncertainty distribution. The phase may, as described further below, map to a height measurement. The phase may also include phase noise (which includes pixel intensity noise).

Figure 1E:
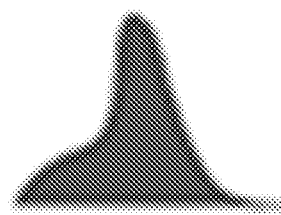

In some example embodiments, the model 199 may generate the height measurement distribution (which indicates the height at one or more location on the object 115) and/or generates a height uncertainty (or error) distribution that defines the height measurement uncertainty. Moreover, the model 199 may, as noted, output the height measurement distribution and/or the height uncertainty distribution. FIG. 1E depicts an example of the height uncertainty distribution. In the examples of FIGS. 1C-E, the uncertainty distributions are determined, as described further below, by removing a noise free uncertainty distribution from a noisy uncertainty distribution (which estimates the noise, such as the uncertainty).

FIG. 2 depicts an example of a process 200 for determining height measurement uncertainty, in accordance with some example embodiments. The description of FIG. 2 also refers to FIGS. 1A-E.

At 205, a measurement may be performed, in accordance with some example embodiments. For example, the image sensor 130A, such as a camera, may perform a measurement of structured light (e.g., a Moiré pattern, a fringe, and/or the like) projected by a light source 130B on to at least the surface of the object 115 (which may also include projection of the fringe onto a reference surface). To illustrate further, the image sensor may capture an image of the surface of the object, when the light source projects the fringe on the object's surface. In some embodiments, the image sensor may capture an image after a layer of the material is applied by the recoater but before sintering by the laser. Alternatively, or additionally, the image sensor may capture an image after a layer of material is sintered.

At 210, a pixel intensity distribution may be generated, in accordance with some example embodiments. For example, the measurement on the surface of the object 115 may generate pixel data. This pixel data may correspond to the pixel intensity as captured by the image sensor 130A during the measurement (e.g., image capture) at 205. The pixel data captures the distribution of the pixel intensity as measured from the surface of the object at one or more points along the surface of the object. This pixel data may also include a noise component, such as pixel intensity noise, phase noise, projector gamma noise, and/or the like, in the DFP height measurements. As noted, the noise component captured by the pixel data is a source of height measurement uncertainty.

At 215, a height error distribution may be generated based on the pixel intensity distribution, in accordance with some example embodiments. In some example embodiments, the model 199 may receive the pixel intensity data and output a height error distribution (also referred to herein as height uncertainty distribution) for the object 115. As noted, the model may also generate a height distribution for the object. In some embodiments, the model 199 may generate a phase uncertainty distribution (an example of which is depicted at FIG. 1D) that captures the phase noise present in the pixel intensity data. The phase noise may be used to represent the pixel intensity noise and thus a source of error or uncertainty in DFP height measurements. In other words, the uncertainty of the height measurements may be derived based on the phase information and, in particular, the phase noise, of the pixel intensity data.

At 220, the height error distribution may be used to determine whether to reject or accept the object as part of a quality control function, in accordance with some example embodiments. To illustrate further, the height error distribution may provide an indication of the measurement error at one or more points along the surface of the object. If the height measurement value at a given point of the object exceeds a threshold height, the height error (which is associated with the height measurement value) may provide an indication of the confidence of the out of tolerance height measurement value. For example, a higher value of the height error may indicate more uncertainty (or less confidence) in the accuracy of the height measurement, when compared to a lower value of the height error.

In some example embodiments, the process 200 may be performed by a processor, such as processor 160, coupled to an additive manufacturing system fabricating an object, such as object 115. In the case of additive manufacturing, in response to a height measurement of object 115 exceeding a threshold height, the processor 160 may provide an indication to reject the object. This indication may be provided based on the height error data indicating a threshold level of certainty (e.g., the error being below a threshold amount of error or the certainty/confidence being above a threshold level of confidence). The indication may also be used to trigger termination of the additive manufacturing process of the part. Alternatively, or additionally, the indication triggers may trigger an alert at a user interface associated with a user of the additive manufacturing system. For example, the alert may indicate the rejection of the object or termination of the additive manufacturing process.

In some example embodiments, the indication may be used to assess if the powder is spreadable or flowable. For example, unused powder may often be recycled and used in later builds. The condition of the powder decreases each recycling. If the powder has been recycled too many times, the powder gets clumpy, which may result in a clump that causes the height measurement at the clump to exceed a height threshold value. In response to the height measurement value exceeding a threshold height (with the corresponding height error data indicating a threshold level of certainty), the indication may signal that the powder may need to be replaced.

In the case of additive manufacturing, in response to a height measurement of object 115 being within a threshold height (with height error data indicating a threshold level of certainty), the processor 160 may provide an indication to continue or restart the additive manufacturing process of the object (e.g., continue adding layers to the object).

In some example embodiments, after each layer is applied to the object undergoing additive manufacturing, the height data and height uncertainty data may be stored by the processor 160. When this is the case, the processor may determine an equivalent printed material height of a plurality of layers with a corresponding height error distribution for each layer. Moreover, the processor may provide, as feedback, one or more parameters to adjust the additive manufacturing process. For example, when there is an uneven surface of the exposed object after layer deposition and fusing (e.g., sintering, melting, etc.), the laser power may be too high (or the scan speed may be too slow), the processor may adjust these fabrication parameters.

Before providing additional details regarding the model 199, the following provides a description regarding the DFP height measurements.

The DFP height measurements may be made by projecting patterns of light onto a flat reference plane (physical or mathematical, denoted further with subscript "r"), then placing an object, such as object 115, onto the scene, and recording how the projected patterns (e.g., the structured light or fringe) deform from the object's shape (denoted further with "o").

Figure 3:
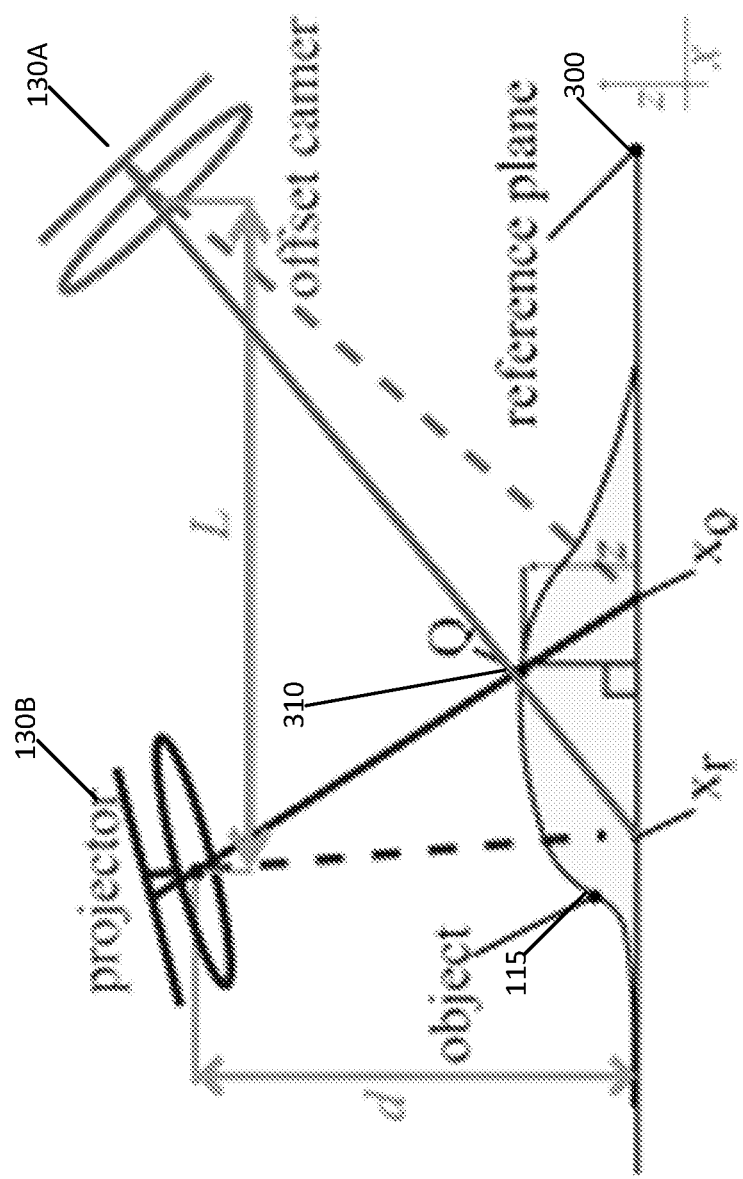
FIG. 3 depicts an example of a digital fringe projection measurement setup, in accordance with some example embodiments.

FIG. 3 depicts an example of a DFP measurement setup. The projected patterns of light may be sinusoidally varying computer generated images, such as fringes, with pixel value f assigned according to $$f_i(x) = R\left[\cos\left(\frac{2\pi x}{P} + \delta_i\right) + 1\right], \quad (1)$$

where R is a scaling factor related to fringe brightness, P is the fringe pitch, and N phase-shifted images are generated and projected onto both reference and object with (equipartitioned) spatial shifts of $\delta_i = 2\pi i/N$, i=1 .... N (further referred to as "projections," where i is the projection index). Equation 1 creates a fringe pattern with varying intensity as a function of x.

The image sensor 130A, such as a camera, may measure the fringe by capturing or recording images of the incident fringes on both reference 300 (dashed lines) and object 115 surfaces (solid lines), where the intensity $I_{(r,o)}$ of any fringe incident on a surface (either the reference r or object o) at any given measurement point $x_{r,o}$ is given by as $$I_{(r,o)} = A_{(r,o)} + B_{(r,o)} \cos(2\pi x_{(r,o)}/P), \quad (2)$$

where $q_{(r,o)} = 2\pi x_{(r,o)}/P$ is the phase, and $A_{(r,o)}$ and $B_{(r,o)}$ are the background intensity due to projector bias (combined with ambient light intensity) and the projected fringe contrast, respectively, at the arbitrary point $x_{(r,o)}$. In order to recover differential information between object and reference phases, which is functionally related to the object height, the measurement point's "i-th" projection intensity in Equation 2 may be each written as $$I_{(r,o),i} = A_{(r,o),i} + B_{(r,o),i} \cos(\phi_{(r,o)} + \delta_i + \phi_c), \quad (3)$$

where $\varphi_c$ accounts for the phase offset of the point in relation to the carrier phase (underformed phase of the projected fringe pattern), and subscript "i" is the projection index.

Once images are captured or recorded of the projected fringes on the reference and object, phase $\varphi_{r,o}$ (either on the reference or object), is found by $$\phi_{(r,o)} = \arctan\left(\frac{-\sum_{i=1}^{N} I_{(r,o),i}\sin\delta_i}{\sum_{i=1}^{N} I_{(r,o),i}\cos\delta_i}\right), \quad (4)$$

where it is assumed that nonlinear projector gamma issues are negligible or appropriately corrected/calibrated.

To determine the height measurement value, the differential phase measurement $\varphi$ between object and reference (which is used to determine the measurement point's height above the reference surface) is given by $$\phi = \phi_o - \phi_r \quad (5)$$

$$= \arctan\left(\frac{-\sum_{i=1}^{N} I_{o,i}\sin\delta_i}{\sum_{i=1}^{N} I_{o,i}\cos\delta_i}\right) - \arctan\left(\frac{-\sum_{i=1}^{N} I_{r,i}\sin\delta_i}{\sum_{i=1}^{N} I_{r,i}\cos\delta_i}\right)$$

$$= \frac{2\pi(x_o - x_r)}{P}. \quad (6)$$

The height measurement value, z, of a measurement point 310 from a reference point on the reference surface may be represented as a function of the geometries of the DFP and the scalar quantities $x_r$ and $x_o$. This relationship may be written as $$z = \frac{d(x_o - x_r)}{L + x_o - x_r}, \quad (7)$$

where d and L are the distance between the projector and the reference plane, and the distance between the projector and the camera, respectively.

Combining Equations 6 and 7, the height, z, may be expressed as a function of the measured differential phase $\varphi$ and geometrical properties of the DFP system as $$z(\phi) = \frac{P\phi d}{2\pi L + P\phi}. \quad (8)$$

The linearized phase-to-height measurement model may be used if it is assumed (which is normally the case) that the spacing between the projector 130B and camera 130A is much larger than the geometric distance between reference and object ray projections $x_r$ and $x_o$ (e.g., $L \gg (x_o - x_r)$). Effectively, this assumption is valid for small height measurements of objects. This assumption simplifies the principal height measurement relationship to a linearized version, so height, $z_l$, is given by $$z_l = \frac{d(x_o - x_r)}{L} \quad (9)$$

$$= \frac{Pd\phi}{2\pi L}.$$

where P is the fringe pitch, where d is the distance between the projector and the reference plane, L is the distance between the projector and the camera, and $\varphi$ is the differential phase measurement $\varphi$.

Comparing Equation 9 to Equation 8, the linearized phase-to-height measurement model of Equation 9 expresses a proportional relationship between estimated height $z_l$ and the differential phase measurement q. This relationship may be used to model the height of an object. In other words, the model 199 may provide one or more height measurements for the object 115 based on Equation 8 or 9. The model 199 may also provide the uncertainty (or error) of those height measurements, in accordance with some example embodiments.

In some example embodiments, there may be provided a model, such as model 199, configured to model height uncertainty. The following provides an example of the model 199 configured to provide a height uncertainty (or error) model, in accordance with some example embodiments.

In some example embodiments, the height uncertainty model (also referred to herein as a height error model or error model) may correspond to a non-linear height model, which does not assume a linear relationship between phase differential and height. When this is the case, the measured differential phase $\varphi$ inherently contains noise, $\kappa$, which arises from a variety of sources. This noise propagates through the phase-to-height transformation (which is described above with respect to Equations 8, for example) yielding uncertainty in the estimated height measurement, z.

The error, such as residual error $\chi$, of a height measurement may be defined by adding the noise $\kappa$ to the differential phase measurement $\varphi$ and then subtracting the true height value as follows: $\chi = z(\varphi+\kappa) - z(\varphi)$. As noted above, the model 199 may determine the height measurement uncertainty by removing a noise free uncertainty distribution, such as $z(\varphi)$, from a noisy uncertainty distribution $z(\varphi+\kappa)$. The noisy differential phase $\varphi+\kappa$ is then substituted from Equation 8, yielding Equation 10 below which provides an estimate of the height uncertainty error, $\chi$, as follows:

$$\chi = z(\phi + \kappa) - z(\phi) \quad (10)$$

$$= \frac{P(\phi + \kappa)d}{2\pi L + P(\phi + \kappa)} - \frac{P\phi d}{2\pi L + P\phi}$$

$$= \frac{\kappa P(d-z)^2}{2\pi Ld + \kappa P(d-z)},$$

where substituting in for $\varphi$ from the inverse of Equation 8 to arrive at the form that relates height uncertainty $\chi$ as a function of phase noise $\kappa$, true height z, and DFP measurement system parameters d (which is the distance between the projector and the reference plane), P (which is the fringe pitch), and L (which is the distance between the projector and the camera).

In some example embodiments, the model 199 may be configured based on Equation 10 to provide an indication of height uncertainty (e.g., $\chi$) of a height measurement based on the determined phase noise K, true height z, and/or DFP measurement system parameters d, P, L.

Assuming the probability density function of the phase noise, $p(\kappa)$, is known or may be modeled, the probability density function associated with the single point height measurement uncertainty, $p(\chi)$, may be determined as $$p(\chi) = \frac{p(\kappa)}{|\partial \chi / \partial \kappa|} \qquad (11)$$

$$= \frac{p(\kappa)(2\pi Ld + \kappa P(d-z))^2}{2\pi LP(d-z)^2 d}$$

$$= \frac{2\pi LdP(\kappa)}{P(\chi + z - d)^2}$$

$$= \frac{2\pi Ldp\left(\frac{2\pi Ld\chi}{P(d-z)(d-z-\chi)}\right)}{P(\chi + z - d)^2},$$

Equation 11 is a general form for any phase noise PDF model form, p(*). The PDF for phase noise arising from pixel intensity noise may be combined with Equation 11 and substituting for κ using the inverse of Equation 10 yields $$p(\chi) = \frac{e^{-z_3}\sec^2 \frac{2\pi L_\chi d}{P(d-z)(d-\chi-z)}\left(1 + \sqrt{\pi} z_2 e^{z_2^2}(\mathrm{erf}(z_2) \pm 1)\right) Ld}{P(-d + \chi + z)^2 z_1 \sqrt{1 - \rho_{XY}^2}}, \qquad (12)$$

where $$z_1 = \frac{\sigma_Y^2 - 2\rho_{XY}\sigma_X\sigma_Y \tan\frac{2\pi L_\chi d}{P(d-z)(d-\chi-z)} + \sigma_X^2 \tan^2\frac{2\pi L_X d}{P(d-z)(d-\chi-z)}}{\sigma_X\sigma_Y(1 - \rho_{XY}^2)}, \qquad (13)$$

$$z_2 = \frac{\mu_Y\sigma_X\left(\rho_{XY}\sigma_Y - \sigma_X \tan\frac{2\pi L_X d}{P(d-z)(d-\chi-z)}\right) + \mu_X\sigma_Y\left(\sigma_X \rho_{XY} \tan\frac{2\pi L_X d}{P(d-z)(d-\chi-z)} - \sigma_Y\right)}{\sqrt{2}\sigma_X\sigma_Y\sqrt{1 - \rho_{XY}^2}\sqrt{\sigma_Y^2 - 2\rho_{XY}\sigma_X\sigma_Y \tan\frac{2\pi L_X d}{P(d-z)(d-\chi-z)} + \sigma_X^2 \tan^2\frac{2\pi L_X d}{P(d-z)(d-\chi-z)}}},$$

$$x_3 = \frac{\mu_Y^2\sigma_X^2 + \mu_X^2\sigma_Y^2 - 2\mu_X\mu_Y\sigma_X\sigma_Y\rho_{XY}}{2\sigma_X^2\sigma_Y^2(1 - \rho_{XY}^2)},$$

and where erf(*) is the standard error function, p, μ, and σ correspond to features of pixel intensity noise (see, e.g., below an example derivation of p, μ, and σ; see also "A model for describing phase-converted images intensity noise in digital fringe projection techniques," Niall M. O'Dowd et al., Optics and Laser in Engineering, Jul. 2, 2020). Quantities σy, σx, and ρxy are functions of measured pixel intensity noise. These quantities are intrinsically related to the standard deviation and correlation of random variables functionally related to ensembles of measured image intensities. Correlation in the noise structure may arise from periodic lighting fluctuations such as overhead fluorescent lights, projector gamma error, dust particle patterns on either optics lens, or other source of noise.

To illustrate by way of an example, after the recoater blade coats the object with a layer of material such as powder, the system 100 may detect, as a defect, a clump of powder (which exceeds a height measurement threshold for the object at a given location or point on the object). The height uncertainty (which is provided as an output by the model 199 in accordance with for example Equation 12)) may provide an output indicative of the certainty of that height measurement and, as such, the existence of the clump. For example, the height measurements may provide one or more height measurements corresponding to the clump on the object and provide the one or more uncertainty values for each height measurement. As such, the uncertainty model 199 may provide uncertainty of measurements from a captured image of the fringe of the object, rather than having to conduct repeated height measurement experiments to quantify the uncertainty.

Equation 12 may determine the single-point probability density function of height measurement uncertainty for any arbitrarily-correlated Gaussian pixel intensity noise. A special case may occur when the pixel intensity noise structure has no inter-projection correlations, no correlations between reference object and test object data, and the noise standard deviations in each object and each reference image are the same for all projections and zero-mean. When this is the case, the height uncertainty distribution may be as follows:

$$p(\chi) = \frac{e^{\frac{-N}{4(\sigma_o^2+\sigma_r^2)}} Ld}{P(-d+\chi+z)^2}$$

$$\left\{ \frac{e^{\frac{N\cos^2\frac{2\pi L_\chi d}{P(d-z)(d-\lambda-z)}}{4(\sigma_o^2+\sigma_r^2)}} \sqrt{\pi} \sqrt{N\cos^2\frac{2\pi L_\chi d}{P(d-z)(d-\chi-z)}} \left( \text{erf}\left( \frac{1}{2}\sqrt{\frac{N\cos^2\frac{2\pi L_\chi d}{P(d-z)(d-\chi-z)}}{\sigma_o^2+\sigma_r^2}} \right) \pm 1 \right)}{2\sqrt{\sigma_o^2+\sigma_r^2}} + 1 \right\},$$

(14)

where $\sigma_r$ and $\sigma_o$ are the noise standard deviations in the reference and object images scaled by fringe contrast, respectively.

Proceeding with the above derivation, a height uncertainty model may be further derived for the linearized height measurement case. The linearized residual height measurement noise may be defined as $\chi = z_l(\varphi+\kappa) - z_l(\varphi)$ and combining with Equation 9 provides $$\chi_l = \frac{P(\phi+\kappa)d}{2\pi L} - \frac{P\phi d}{2\pi L} = \frac{\kappa P d}{2\pi L}. \tag{15}$$

The change of variables technique gives the height uncertainty distribution as $$p(\chi_l) = \frac{p(\kappa)}{|\partial \chi_l / \partial \kappa|} \tag{16}$$

$$= \frac{2\pi L p(\kappa)}{Pd}$$

$$= \frac{2\pi L p\left(\frac{2\pi L \chi_l}{Pd}\right)}{Pd}.$$

For the same specific phase noise model described above, Equation 16 may be further modified to provide $$p(\chi_l) = \frac{e^{-z_3} \sec^2 \frac{2\pi L \chi_l}{Pd} \left(1 + \sqrt{\pi} z_2 e^{z_2^2}(\text{erf}(z_2) \pm 1)\right) L}{z_1 \sqrt{1 - \rho_{XY}^2} Pd},$$

where $$z_1 = \frac{\sigma_Y^2 - 2\rho_{XY}\sigma_X\sigma_Y \tan\frac{2\pi L_{\chi t}}{Pd} + \sigma_X^2 \tan^2 \frac{2\pi L_{Xt}}{Pd}}{\sigma_X \sigma_Y (1 - \rho_{XY}^2)},$$

$$z_2 = \frac{\mu_Y \sigma_X \left(\rho_{XY}\sigma_Y - \sigma_X \tan\frac{2\pi L_{Xt}}{Pd}\right) + \mu_X \sigma_Y \left(\sigma_X \rho_{XY} \tan\frac{2\pi L_{Xt}}{Pd} - \sigma_Y\right)}{\sqrt{2} \sigma_X \sigma_Y \sqrt{1-\rho_{XY}^2} \sqrt{\sigma_Y^2 - 2\rho_{XY}\sigma_X\sigma_T \tan\frac{2\pi L_{Xt}}{Pd} + \sigma_X^2 \tan^2 \frac{2\pi L_{Xt}}{Pd}}},$$

$$z_3 = \frac{\mu_Y^2 \sigma_X^2 + \mu_X^2 \sigma_Y^2 - 2\mu_X \mu_Y \sigma_X \sigma_Y \rho_{XY}}{2\sigma_X^2 \sigma_Y^2 (1 - \rho_{XY}^2)},$$

and the quantities $\sigma y$, $\sigma x$, and $\rho xy$ are as noted above. This derivation may require updating the conditions of the previously-derived $p(\kappa)$ distribution, using Equation 15. This results in using the minus sign (−) in Equation 17 when $$|\chi_l| < \frac{Pd}{4L}.$$

and the plus sign (+) when $$\frac{Pd}{4L} > |\chi_l| > \frac{Pd}{4L}.$$

Equation 17 is the linearized height measurement model analogue to Equation 12. When compared to Equation 12, Equation 18 provides the same height uncertainty output but assumes a linear relationship in the phase to height conversion.

Finally, for the special case of the pixel intensity noise structure described above, the linearized model analogous to Equation 14 may be represented as follows (17)

(18)

$$p(\chi_t) = \frac{e^{\frac{-N}{4(\sigma_o^2+\sigma_r^2)L}}}{Pd} \left( \frac{N\cos^2\frac{2\pi L\chi_t}{Pd}}{e^{\frac{N\cos^2\frac{2\pi L\chi_t}{Pd}}{4(\sigma_o^2+\sigma_r^2)}}} \sqrt{\pi} \sqrt{N\cos^2\frac{2\pi L\chi_t}{Pd}} \left( \text{erf}\left[ \frac{1}{2}\sqrt{\frac{N\cos^2\frac{2\pi L\chi_t}{Pd}}{\sigma_o^2+\sigma_r^2}} \right] \pm 1 \right)}{2\sqrt{\sigma_o^2+\sigma_r^2}} + 1 \right). \quad (19)$$

Equation 18 is similar to Equation 14 in some response but assumes a linear relationship in the phase to height conversion. To verify the height error model, ensembles of Monte-Carlo simulated phase measurements φMC may be used to verify the derived height uncertainty models, with varying levels of pixel noise correlation and standard deviation, each using 98304 samples, for example. The Monte-Carlo ensembles may be generated by adding pixel intensity noise $\bar{\epsilon}_{r,o}$ to the $I_{r,o}$ terms in Equation 5 and combining Equations 8 and 9 for the full MC model and the linear MC model, respectively, giving $$z_{MC} = \frac{Pd\left( \arctan\left( \frac{-\sum_{i=1}^N (I_{o,i}+\bar{\epsilon}_{o,i})\sin\delta_i}{\sum_{i=1}^N (I_{o,i}+\bar{\epsilon}_{o,i})\cos\delta_i} \right) - \arctan\left( \frac{-\sum_{i=1}^N (I_{r,i}+\bar{\epsilon}_{r,i})\sin\delta_i}{\sum_{i=1}^N (I_{r,i}+\bar{\epsilon}_{r,i})\cos\delta_i} \right) \right)}{2\pi L + P\left( \arctan\left( \frac{-\sum_{k=1}^N (I_{o,i}+\bar{\epsilon}_{o,i})\sin\delta_i}{\sum_{i=1}^N (I_{o,i}+\bar{\epsilon}_{o,i})\cos\delta_i} \right) - \arctan\left( \frac{-\sum_{i=1}^N (I_{r,i}+\bar{\epsilon}_{r,i})\sin\delta_i}{\sum_{k=1}^N (I_{r,i}+\bar{\epsilon}_{r,i})\cos\delta_i} \right) \right)}, \quad (20)$$

$$z_{MC,l} = \frac{Pd}{2\pi L}\left( \arctan\left( \frac{-\sum_{i=1}^N (I_{o,i}+\bar{\epsilon}_{o,i})\sin\delta_i}{\sum_{i=1}^N (I_{o,i}+\bar{\epsilon}_{o,i})\cos\delta_i} \right) - \arctan\left( \frac{-\sum_{k=1}^N (I_{r,i}+\bar{\epsilon}_{r,i})\sin\delta_i}{\sum_{i=1}^N (I_{r,i}+\bar{\epsilon}_{r,i})\cos\delta_i} \right) \right). \quad (21)$$

Pixel intensity noise $\bar{\epsilon}_{r,i}$ may be defined for the reference and the object images with jointly normal distributions, allowing arbitrary image-to-image correlation, i.e., $\bar{\epsilon}_{r,i} \sim N(\mu_{r,i}, \sigma_{r,i}, \Sigma_{r,ij})$ and $\bar{\epsilon}_{o,i} \sim N(\mu_{o,i}, \sigma_{o,i}, \Sigma_{i,ij})$, i=1 ... N where μ is the pixel intensity noise mean, σ is the pixel intensity noise standard deviation, and Σ is the image-to-image pixel intensity noise correlation. The j subscript allows for the cross correlation between noise statistics at different projection indexes. The reference and object images may also be correlated with correlation matrix $\Sigma_{or,ij}$.

This allows for the general possibility that the i-th projection object image noise could be correlated with the j-th projection reference image noise (in addition to the earlier allowance that individual reference and object images may be intra-correlated). In the Monte-Carlo simulations, a single measurement point was modeled with a height z=2.09 cm and the simulated DFP geometries L and d were selected as 5 cm and 30 cm, respectively, deliberately chosen to provide clear distinctions between the full model and linear model height distributions in FIG. 4. Fringe pitch P was selected as 8.5 mm and 4 projections were used. Table 1 shows the specific statistics of the pixel intensity noise used for model verification.

TABLE 1

| Parameter | Variable | Quanity | Quanity |
|---|---|---|---|
| Reference image pixel noise std. | $\sigma_r$ | {0.175, 0.22, 0.145, 0.05} | {0.175, 0.22, 0.145, 0.05}, {0.525, 0.66, 0.435, 0.465} |
| Object image pixel noise std. | $\sigma_o$ | {0.54, 0.36, 0.45, 0.36} | {0.18, 0.12, 0.15, 0.12}, {0.54, 0.36, 0.45, 0.36} |
| Reference image pixel noise correlation matrices | $\rho_r$ | $\begin{pmatrix} 1. & 0.203 & 0.143 & 0.1 \\ 0.203 & 1. & 0.043 & 0.302 \\ 0.143 & 0.043 & 1. & 0.078 \\ 0.1 & 0.302 & 0.078 & 1. \end{pmatrix} \cdot \begin{pmatrix} 1. & 0.691 & 0.774 & 0.86 \\ 0.691 & 1. & 0.855 & 0.696 \\ 0.774 & 0.855 & 1. & 0.769 \\ 0.86 & 0.696 & 0.769 & 1. \end{pmatrix}$ | $\begin{pmatrix} 1. & 0.601 & 0.493 & 0.594 \\ 0.601 & 1. & 0.54 & 0.4 \\ 0.493 & 0.54 & 1. & 0.768 \\ 0.594 & 0.4 & 0.768 & 1. \end{pmatrix}$ |
| Object image pixel noise correlation matrices | $\rho_o$ | $\begin{pmatrix} 1. & 0.297 & 0.25 & 0.099 \\ 0.297 & 1. & 0.401 & 0.202 \\ 0.25 & 0.401 & 1. & 0.292 \\ 0.099 & 0.202 & 0.292 & 1. \end{pmatrix} \cdot \begin{pmatrix} 1. & 0.886 & 0.751 & 0.785 \\ 0.886 & 1. & 0.774 & 0.895 \\ 0.751 & 0.774 & 1. & 0.65 \\ 0.785 & 0.895 & 0.65 & 1. \end{pmatrix}$ | $\begin{pmatrix} 1. & 0.597 & 0.501 & 0.599 \\ 0.597 & 1. & 0.401 & 0.5 \\ 0.501 & 0.401 & 1. & 0.503 \\ 0.599 & 0.5 & 0.503 & 1. \end{pmatrix}$ |

To further assess the validity of the disclosed models, comparisons were made of the linearized height uncertainty model to experimental height measurement maps with a prototype DFP system. The height uncertainty model was evaluated under assumed ergodic conditions (e.g., that the distribution of phase values of many iterations of a measurement point would approach the inherent uncertainty of a single phase measurement point). A DFP experiment was conducted 85 times (referred onward as 85 iterations) using projections N=10, 14, and 18, measuring an unmoved, identical surface for the object and reference plane. This experiment was conducted using the standard 8-bit imaging capabilities of the camera system, and then repeated using the "BaslerBG12" setting which captures three-channel color images in 12-bit depth projections N=10, and 14, which were converted to mono-color 16-bit depth prior to image processing. The experiment was performed with camera capturing with two different bit depths to observe the effects of pixel value quantization on phase error relative to pixel intensity noise.

Using a single, unmoved surface ensured two factors; first, that the true height value z for each measurement pixel is known as 0, and second, that the distribution of height noise across all iterations on the height map provided by the DFP system was not caused by mismatched subtleties in the height of the measured object. The known height map of 0 allowed the usage of the linearized height uncertainty model from Equations 17 and 19 (special case). The 85 iterations recorded for each phase shifted projection, were used for statistical computation of the inputs for the model, ($\sigma_r$, $\sigma_o$, $\rho_r$, $\rho_o$, and $\rho_{ro}$). A height map was created from the phase map for each iteration using a calibration routine; this resulted in the measured value of L/(Pd)=1.54 mm/rad. The amount of iterations was chosen to provide a middle ground between ability to accurately estimate noise statistics, and ambient pixel intensity fluctuation between captures. A full field map of $\varphi_c$ (describing the carrier phase, and incorporated in terms $\sigma_y$, $\sigma_x$, and $\rho xy$) was constructed from the unwrapped reference phase measurement or. Using the unwrapped phase measurement to account for the carrier phase, as opposed to simply using pixel index, allowed adaptation to possible mismatched viewing angle of fringes (not perfectly horizontal or vertical). Finally, the distribution of all 85 height values at each pixel in the measured area were compared to the linearized derived height uncertainty model $p(\chi_i)$ to assess the accuracy of the derived model.

Figure 5:
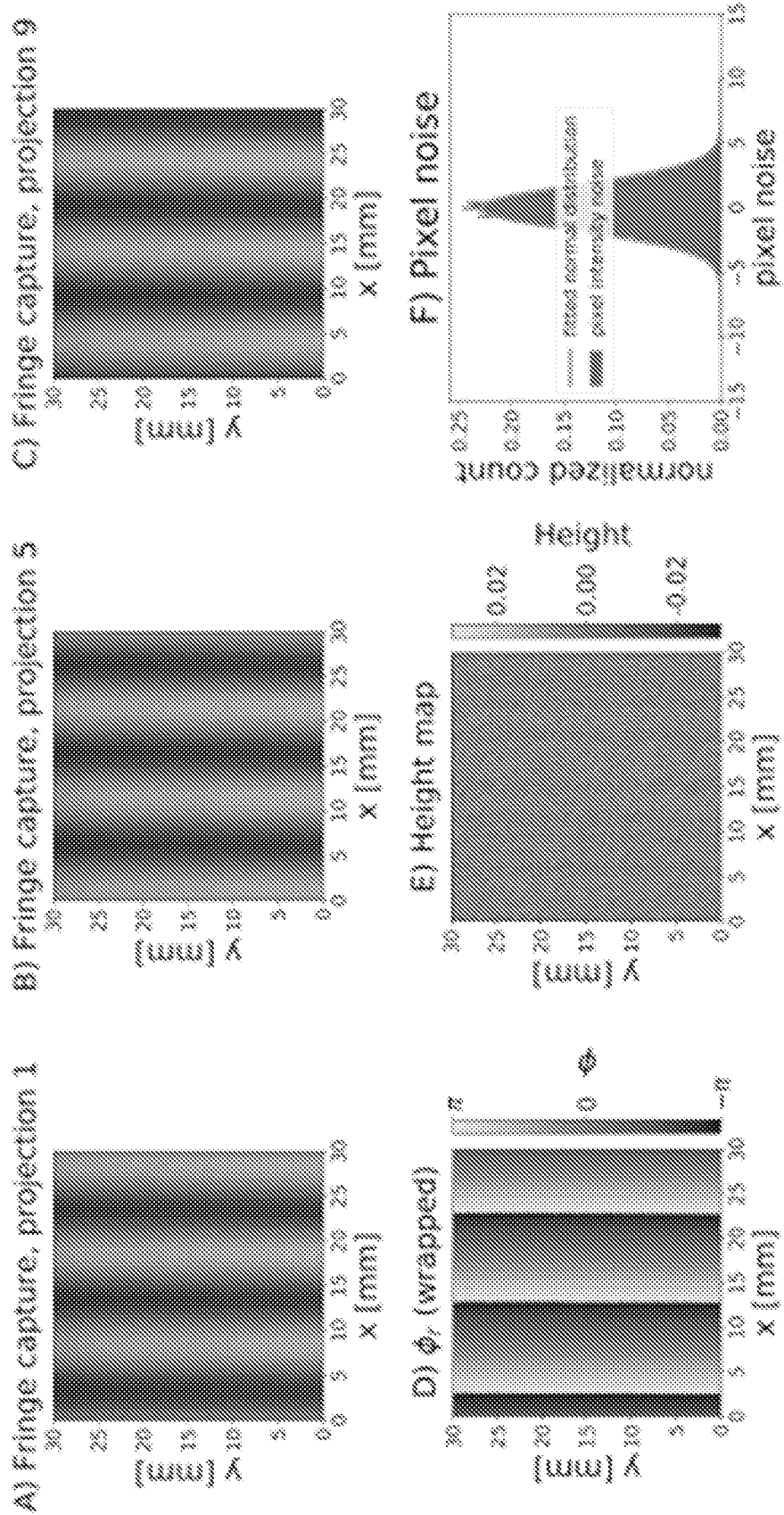
FIG. 5 shows examples of results of a digital fringe projection height measurement process, in accordance with some example embodiments.

FIG. 5 shows example results of a DFP height measurement process using images with 8-bit depth and 14 projections. The examples of the measurement process in the 8-bit depth range provide results that may be more representative of common DFP setups. FIG. 5 at A-C show a sample of the captured incident fringes on the reference surface, each image having a unique phase shift $\delta i$. FIG. 5 at D shows an example wrapped phase map of the reference surface, before the spatial unwrapping procedure is applied to remove $2\pi$ discontinuities. FIG. 5 at E shows an example height map of a single measurement iteration. FIG. 5 at F shows a sample distribution of raw pixel noise, with a fitted normal distribution, verifying the model of pixel intensity noise as a normally distributed random variable in the phase uncertainty derivation for p(k), and thus p(X). In FIG. 5, the pixel noise is shown with units of intensity not yet normalized by the fringe contrast. Pixel intensity units are by nature integers quantized by the camera, and show them as the difference to their mean, which is a decimal numerable, allowing for non-integer components in the histogram presented.

Figure 6:
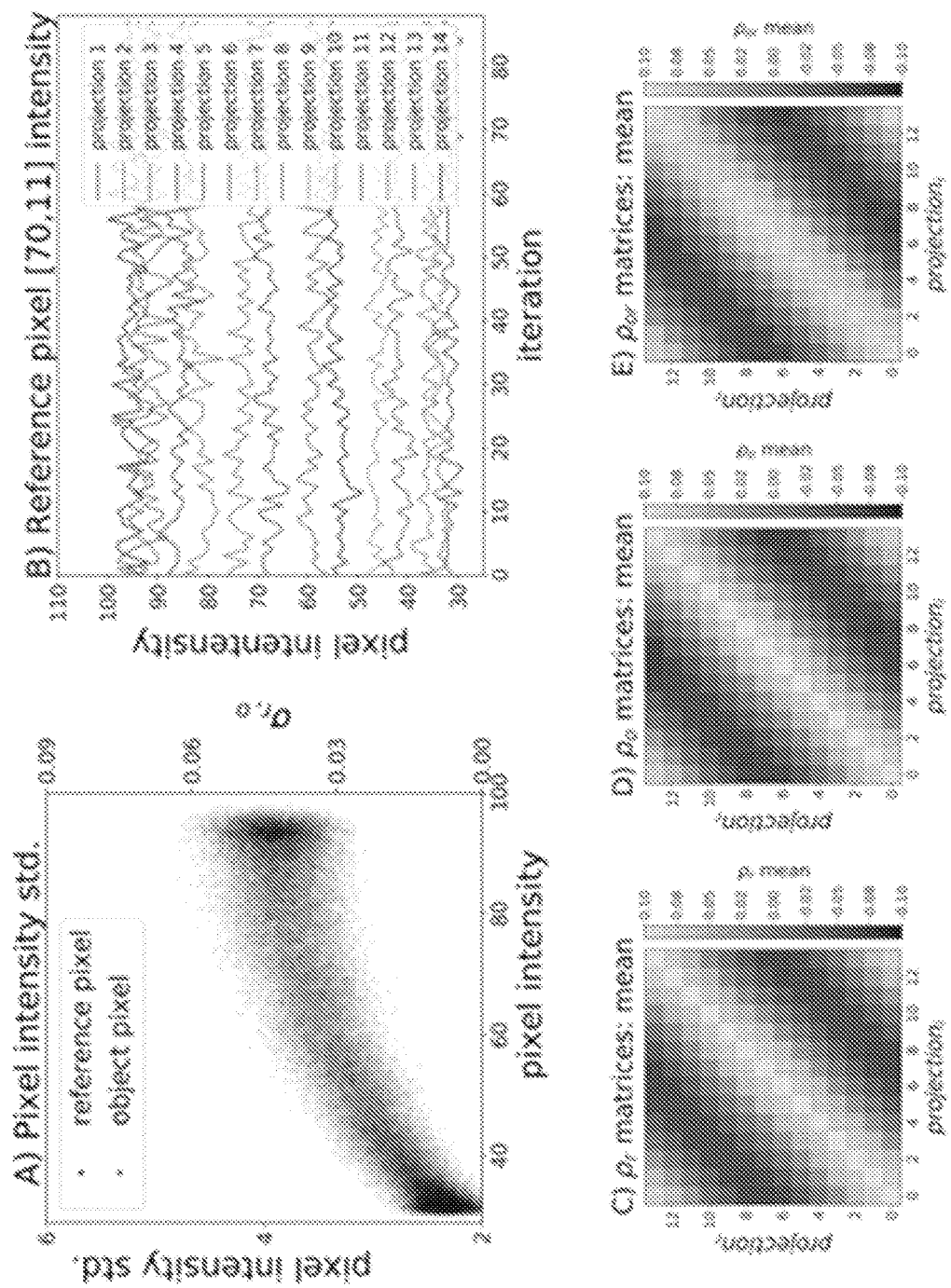
FIG. 6 shows examples of plots that illustrate the measured structure of pixel noise, in accordance with some example embodiments.

The images collected during the 85 iteration DFP height measurement procedure were used to determine the noise statistics which are the input to our uncertainty model. FIG. 6 shows a collection of plots that illustrate the measured structure of pixel noise for the 14 projection DFP experiment. FIG. 6 at A shows the pixel standard deviation, with the primary y-axis showing the pixel intensity standard deviation (before normalizing to the fringe contrast), and the secondary y-axis shows the pixel intensity standard deviation $\sigma_{r,o}$ normalized by fringe contrast, found by dividing the raw standard deviation by the measured fringe contrast for each pixel. It can be observed that the standard deviation was positively related to the pixel intensity which is significant due to its impact on the assumptions required for the special case described above. FIG. 6 at B shows a single pixel's intensity value across all 14 fringe projection projections, for each iteration, on the object image. For each pixel, $p_{r,ij}$ was estimated by finding the correlation of intensity values of projection "i" and projection "j" on the reference plane, and similarly for $p_{o,ij}$ on the object plane. For each pixel, $p_{ro,ij}$ was estimated by finding the correlation of intensity values of projection "i" on the reference plane, and projection "j" on the object plane. Each off-diagonal term in $p_o$ and $p_r$ were approximately normally distributed, allowing for their means and standard deviations to accurately summarize their distributions. FIG. 6 at C-E show the standard mean of $p_r$, $p_o$, and pro averaged across all pixels in the measurement scene, respectively. For this 8-bit, 14 projection experiment, a trend of low, positive correlation of pixel intensity noise with nearest-to-diagonal terms approximately 0.07-0.08 was observed. A slight structure can be observed in the off-diagonal terms of the correlation matrices; near-diagonal terms (representing images captured temporary close), as well as farthest-from-diagonal (outermost), exhibiting the highest correlation. The non-identity correlation structures measured in experiment are significant due to their impact on the assumptions required for the special case described above.

Figure 7:
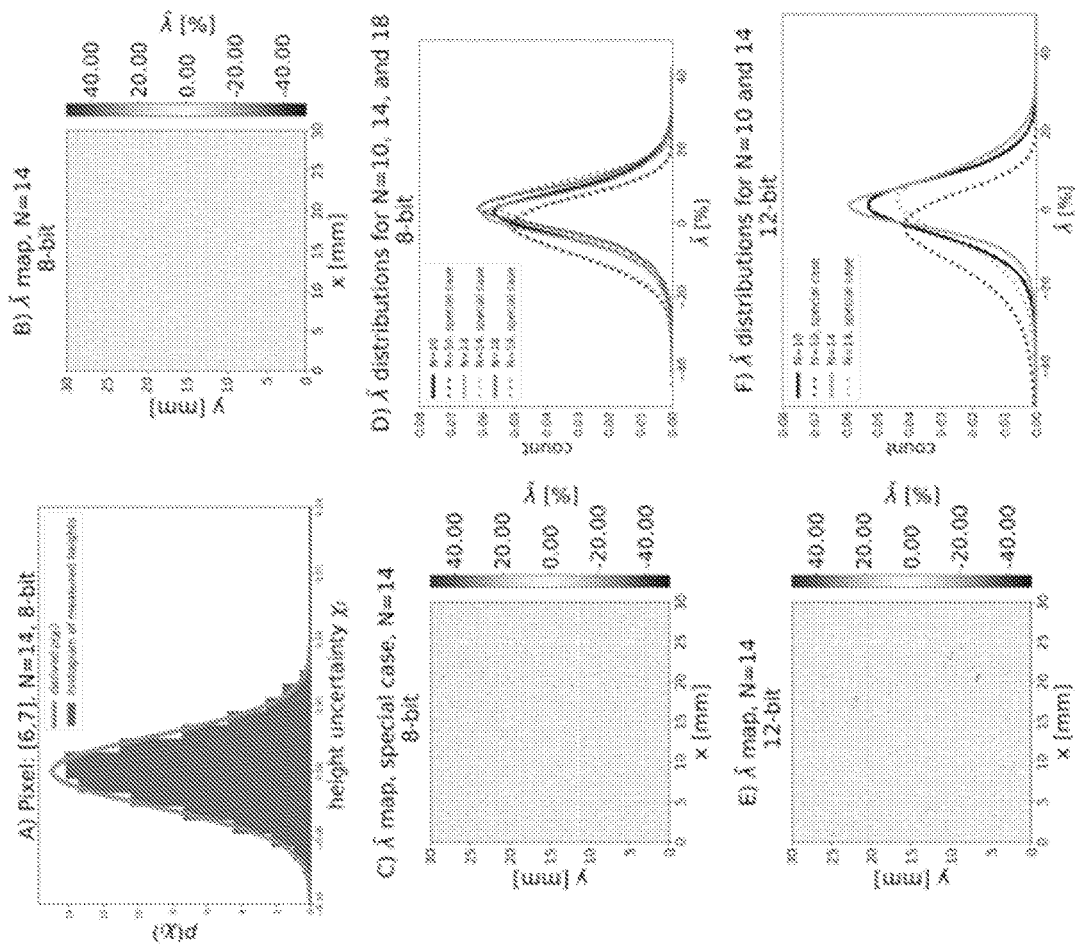
FIG. 7 shows example plots related to height uncertainty, in accordance with some example embodiments.

Results comparing the experimental distribution of measured height values to the estimation of height uncertainty, $p(\chi_i)$, are shown at FIG. 7 and a summary of the results in Table 2. FIG. 7 at A-D shows results from the DFP experiment using 8-bit images, while FIG. 8 at E-F show results using 12-bit images. FIG. 7 at A shows a comparison of an example pixel's height distribution across all experiment iterations compared to p(x) estimated using the pixel's image intensity statistics $\sigma_r$, $\sigma_o$, $\rho_r$, $\rho_o$, and $\rho_{ro}$ measured from the experiment. In order to report the accuracy of our height uncertainty model for every pixel in the measured area, a performance metric $\lambda^-$ was created that represents the normalized difference of the estimated height uncertainty and the distribution of height measurements across all iterations. Each pixel in $\lambda^-$ is calculated using $\lambda^- = (\sigma_m - \sigma_e)/\sigma_m$, where $\sigma_m$ is the standard deviation of the measured heights of each pixel, and $\sigma_e$ is the standard deviation of $p(\chi_i)$. The error map is constructed to provide positive values when $p(\chi_i)$ underestimates the standard deviation of the height distribution. FIG. 7 at B shows the normalized difference map $\lambda^-$ for every pixel in the measured area, using the linearized height uncertainty model $p(\chi_i)$ from Equation 17 and measured noise correlation statistics. FIG. 7 at C shows the normalized difference map $\lambda^-$ when using the simplified model from Equation 19 for the special case noted above (where no pixel noise correlation and the average pixel noise standard deviation across all projections). The example measurement noise statistics provided in FIG. 7 show that there was in fact noise correlation in our experiment, sot the special case assumptions of Equation 19 will induce error. This causes the normalized difference map $\lambda^-$ in FIG. 7 at C to differ from FIG. 7 at B, shifting from positive to negative mean.

FIG. 7 at D shows the distributions of normalized difference maps $\lambda^-$ for the full and special cases, for all 3 8-bit experiments using N=10, 14, 18 projections. It can be observed that the height error prediction performed better in cases with higher N, a reason for this trend may be that projector gamma error is reduced when using more projections. The distributions of $\lambda^-$ created from $p(\chi_d)$ using correlation statistics were positively biased by 2.2%, 1.9%, 3.7% and with standard deviations of 8.2%, 8.0%, and 7.8% for the experiments using 10, 14, and 18 projections, respectively. The distributions of $\lambda^-$ created from $p(\chi_d)$ predicting a tighter height uncertainty than measured in experiment (which may be due to other sources of error entering the height calculation such as external vibrations, subtle environmental lighting fluctuations, gamma error, and projector draw lines).

Figure 4:
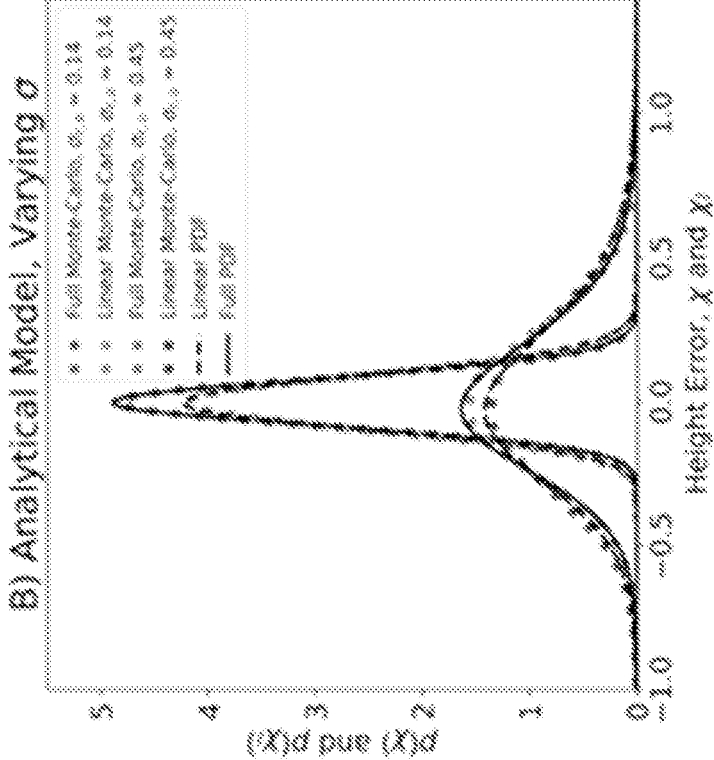
FIG. 4 depicts an example of simulation results associated with the height uncertainty, in accordance with some example embodiments.
Figure 4:
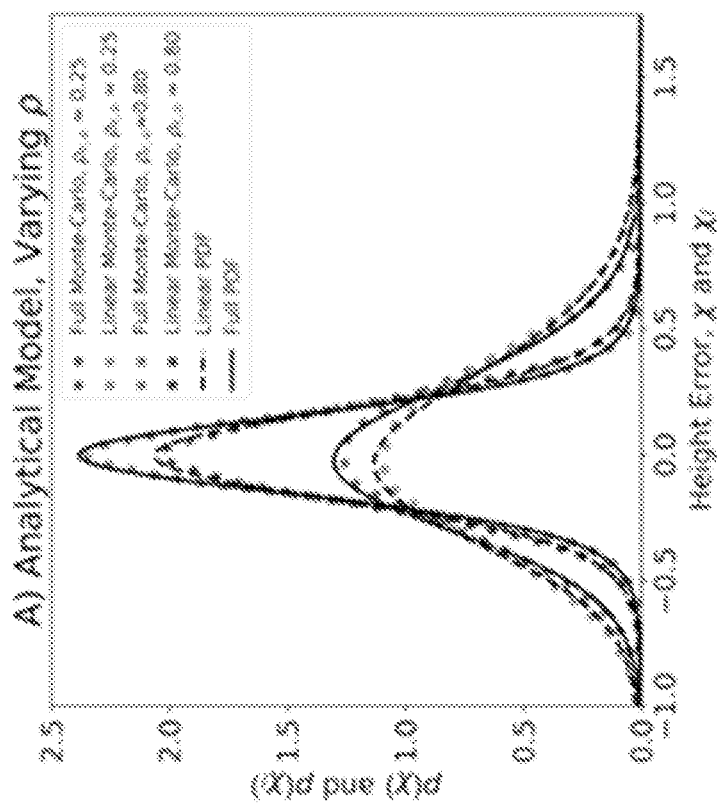

$\lambda^-$ distributions created from ignoring noise correlation (special case) for 8 bit experiments using 10 and 14 projections were slightly negatively biased by -1.9% and -1.4%, with standard deviations of 10.5% and 8.6%, respectively. This may be due in part to the introduction of correlation reduces height uncertainty, as shown in FIG. 4 at A, and assuming no correlation exists increases the height uncertainty estimation made by our model. $\lambda^-$ distributions from the 18 projection experiment created from ignoring noise correlation was positively biased by 3.6%, with a standard deviation of 7.4% and considerably closer to the full model's error distribution. This may be due to very low levels of correlation during the 18 projection experiment (averages of the near-diagonal terms of the p matrices were approximately 0.02 during the 18 projection experiment as opposed to 0.08 for both 10 and 14 projection experiments).

TABLE 2

|  |  |  | Bias | Standard deviation | Mean off-diagonal $p_{r,o,r,o}$ value |
|---|---|---|---|---|---|
| 8-bit | Full linear model | 10 projections | +2.2% | 8.2% | p ≈ 0.08-0.09 |
|  |  | 14 projections | +1.9% | 8.0% | p ≈ 0.07-0.08 |
|  |  | 18 projections | +3.7% | 7.8% | p ≈ 0.02-0.03 |
|  | Special case | 10 projections | -1.9% | 10.5% | p ≈ 0.08-0.09 |
|  |  | 14 projections | -1.4% | 8.6% | p ≈ 0.07-0.08 |
|  |  | 18 projections | +3.6% | 7.4% | p ≈ 0.02-0.03 |
| 12-bit | Full linear model | 10 projections | +0.9% | 9.3% | p ≈ 0.13-0.20 |
|  |  | 11 projections | +2.5% | 8.1% | p ≈ 0.11-0.22 |
|  | Special case | 10 projections | -8.7% | 14.5% | p ≈ 0.13-0.20 |
|  |  | 14 projections | -0.5% | 10.7% | p ≈ 0.11-0.22 |

FIG. 7 at E and F show the effects of using 12-bit imaging. Similar model height estimation error was observed for these experiments compared to the 8-bit image capture experiments, suggesting that our uncertainty model's performance is independent of pixel quantization effects. A difference in the experiment was that our observed pixel noise correlation was much higher when using 12-bit images (see Table 2). A formal analysis of the quantization occurring within the camera was considered, but deemed out of the scope of this paper. FIG. 7 at E is positively biased, similar to its 8-bit counterpart in FIG. 7 at B, and FIG.,. 7 at F shows similar distributions to its 8-bit counterpart in FIG. 8 at D. The model estimation accuracy bias for 12-bit full cases for N=10 and 14 are 0.9% and 2.5%, and standard deviations of 9.3% and 8.1%, respectively. For the special case, estimation biases were recorded as -8.7% and -0.5% and with standard deviations of 14.5% and 10.7%, for N=10 and 14, respectively. The large negative bias for the 10 projection special case may be attributed to be the large amount of correlation observed through the experiment (off-diagonal terms averaging around 0.15).

In some example embodiments, there may be provided a model 199 configured to provide a height-converted image intensity noise uncertainty model. The model 199 may be based on, for example, Equation 12 derived as a continuation of the phase-converted image intensity noise uncertainty model form. As the DFP height profiling process is often linearized during practice, a linearized model as in Equation 17, may also be used as the model 199. Additionally, the model 19 may be based on simplified versions of the full and linear height uncertainty models as shown in Equations 14 and 19.

Although some of the examples described herein refer to using the error model to quantify uncertainty of a light based optical measurement using DFP, the error model may provide an uncertainty indication for other types of light or optical based measurement technologies as well. For example, the error model may be used in a measurement system using digital image correlation technology to perform measurements, such as height measurements. With digital image correlation, one or more cameras capture images of a surface of an object (which may be undergoing additive manufacturing). An algorithm finds matching features in each image and a height map is created. Specifically, the locations of these features in each image, and the spatial relationship of the cameras may serve as inputs to a height equation to provide a height measurement value. The error uncertainty model disclosed herein may be used to provide an indication of the uncertainty, such as the error induced by light (which is captured in the image as pixel noise or pixel intensity noise). Likewise, an image contact scanner technology may include an image bar to capture an image of a surface of an object (which may be undergoing additive manufacturing). The image bar may be fixed to the recoater blade (e.g., in a powder bed fusion system), or coupled to a lamp, print head, or recoater (e.g., in binder jetting). As the image bar moves across the object's surface, images are taken extremely close to the surface of the object. The amount of "blurriness" of the imaged surface is quantified and used to determine the distance of these blurry areas to the focal plane. This distance is formatted in a height map. Here again, the error uncertainty model disclosed herein may be used to provide an indication of the uncertainty, such as the error induced by light (which is captured in the image as pixel noise or pixel intensity noise). And, coherent light imaging technology may be used to determine height of the object. In the case of coherent light imaging, an interferometer/laser is diffused to produce an area of illumination, often known as a speckle pattern. One or more cameras take images of the build area of the object, while the laser illumination changes phase. The cameras may be linked with part of the beam of the interferometer. These images of the surface, illuminated with the interferometer are combined to form a height map. The error uncertainty model disclose herein may also be used to provide an indication of the uncertainty, such as the error induced by light (which is captured in the image as pixel noise or pixel intensity noise).

Figure 8:
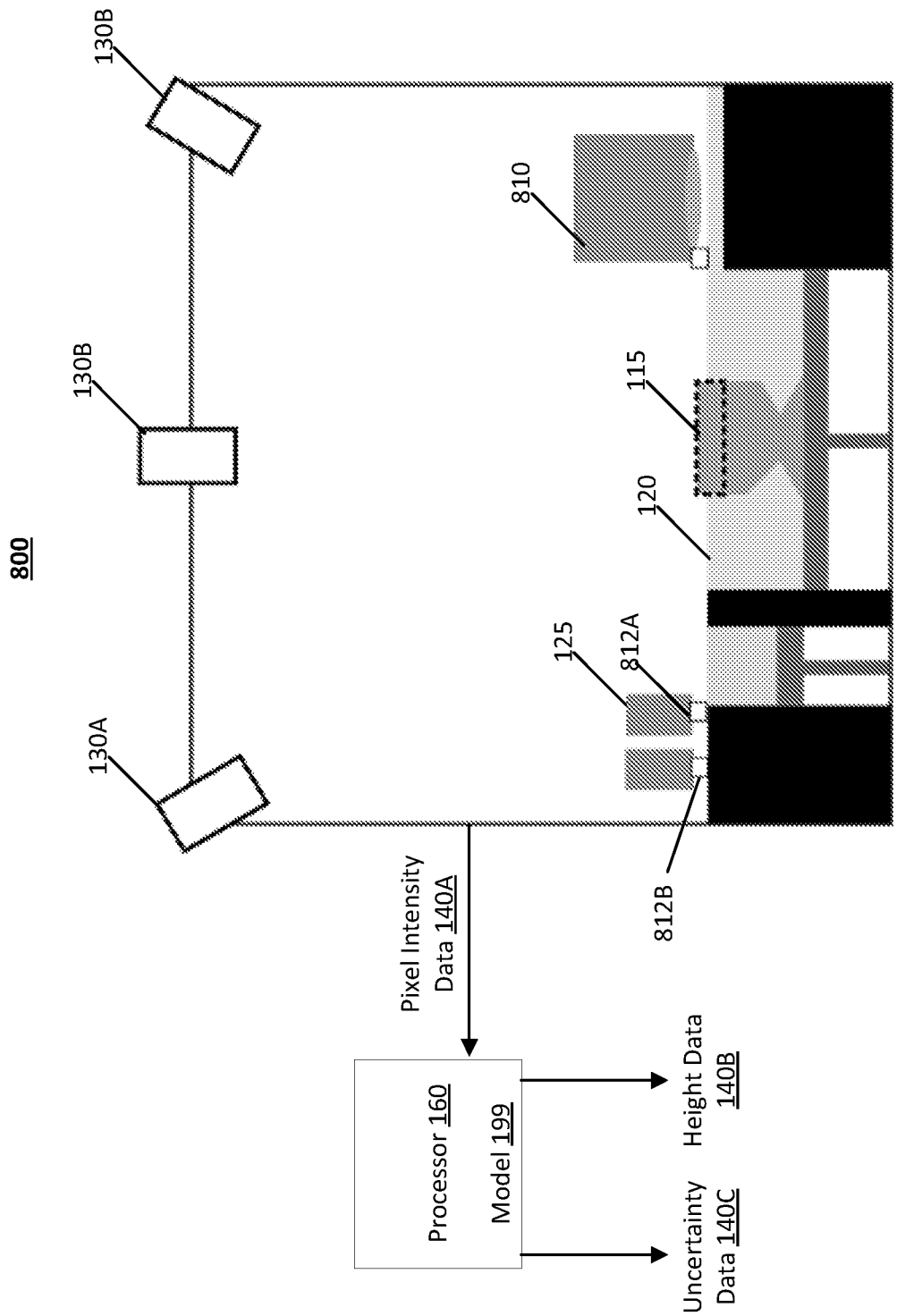
FIG. 8 depict an example of binder jetting, in accordance with some example embodiments.

FIG. 8 depicts another example of an additive manufacturing system 800, in accordance with some example embodiments. The system 801 is similar to system 100 in some respects but uses binder jetting technology. In the example of FIG. 8A, print head 810 selectively deposits a liquid binding agent onto a thin layer of material (e.g., powder particles such as metal, sand, ceramics, composites, and/or the like) to build the object 115. Rather than use a laser to sinter, the lamp evaporates the solvent from the binder to form a layer on the object 115. In operations, one or more image sensors 812A-B may be configured as image contact scanners. In this example, as the image sensors 812A-B move across the object, the image sensors capture an image of a surface of an object (which may be undergoing additive manufacturing). For example, the image sensor 812B may be fixed to the recoater blade (e.g., in a powder bed fusion system). As noted, the image sensors 812A-B move across the object's surface and capture images of the surface of the object. The amount of "blurriness" of the imaged surface is quantified and used to determine the distance of these blurry areas to the focal plane. This distance is mapped to a height. For example, the blurriness may be a layer of applied material, a clump of material, etc. The model 199 may provide an indication of the uncertainty associated with the height measurement.

As noted above, the processor 160 may receive and process the measurement to determine height data for the powder applied to the object 115 and/or uncertainty data related to the height measurement, in accordance with some example embodiments. In some example embodiments, the processor 160 may receive pixel intensity data 140A from image sensors 812A-B. The processor may output height measurement data 140B for the powder applied on the object, and/or may output uncertainty data 140C that indicates the uncertainty associated with the height measurement data 140B. In some example embodiments, the processor includes the model 199 that provides the height measurement data and/or the uncertainty data based on the pixel intensity data.

Figure 9:
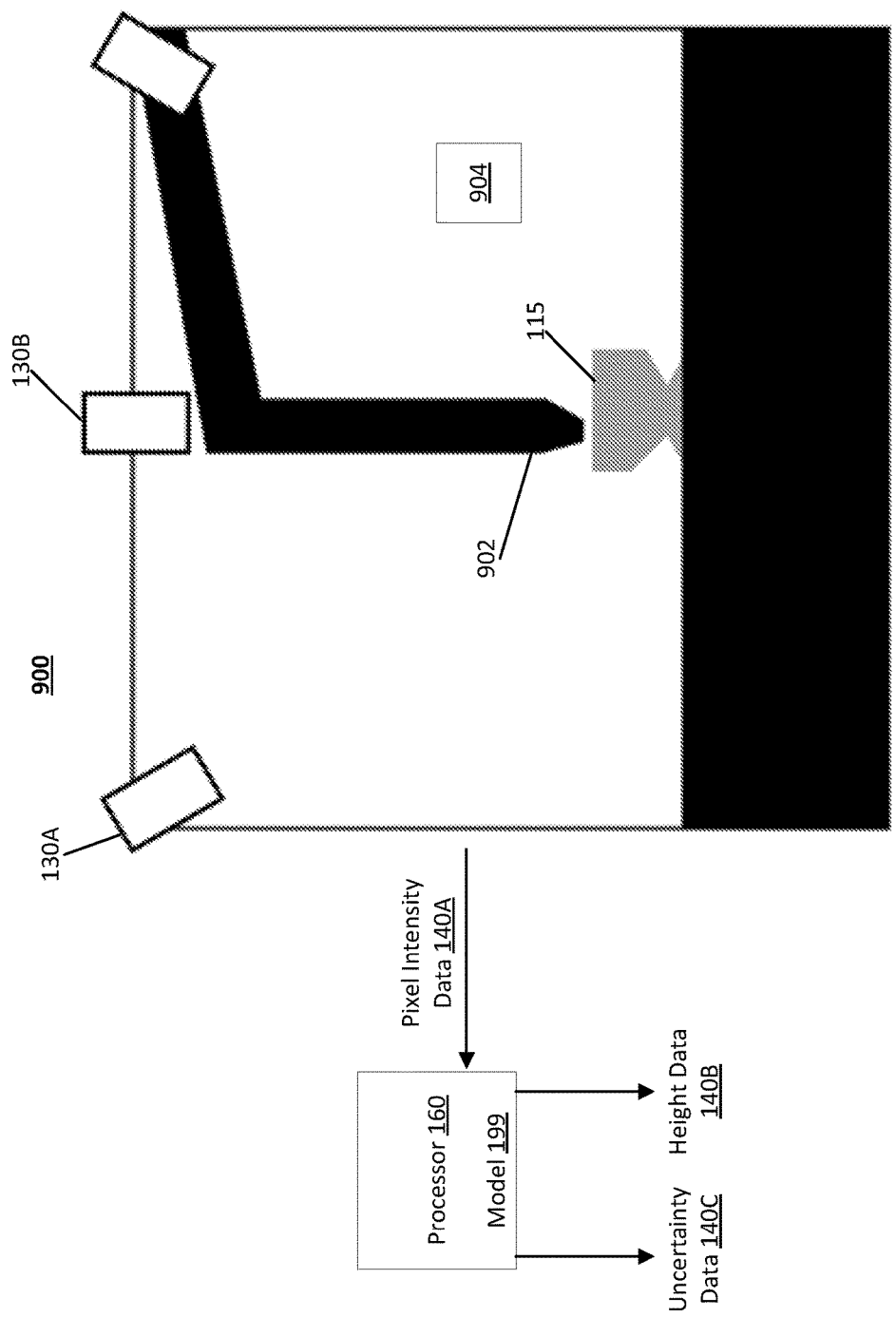
FIG. 9 depict an example of direct energy deposition (or direct metal deposition), in accordance with some example embodiments.

FIG. 9 depicts another example of an additive manufacturing system 900, in accordance with some example embodiments. In the example of FIG. 9, direct energy deposition (or direct metal deposition) is depicted. In FIG. 9, a feedstock material may be pushed through a feed nozzle 902. The feedstock may be a material (e.g., powder particles such as metal, sand, ceramics, composites, and/or the like) to build the object 115. The feed stock is then melted by a heat source 904, such as a laser, electron beam, or arc to sinter each layer of material applied. In operations, the light source 130B may project light on the object, while the imaging sensor 130A, performs a measurement by capturing an image of at least a portion of the surface of the object (which includes a fringe projection on the surface). As noted above, the processor 160 may receive and process the measurement to determine height data for the powder applied to the object 115 and/or uncertainty data related to the height measurement, in accordance with some example embodiments. In some example embodiments, the processor 160 may receive pixel intensity data 140A from the camera 130A. The processor may output height measurement data 140B for the powder applied on the object, and/or may output uncertainty data 140C that indicates the uncertainty associated with the height measurement data 140B. In some example embodiments, the processor includes the model 199 that provides the height measurement data and/or the uncertainty data based on the pixel intensity data.

Figure 10:
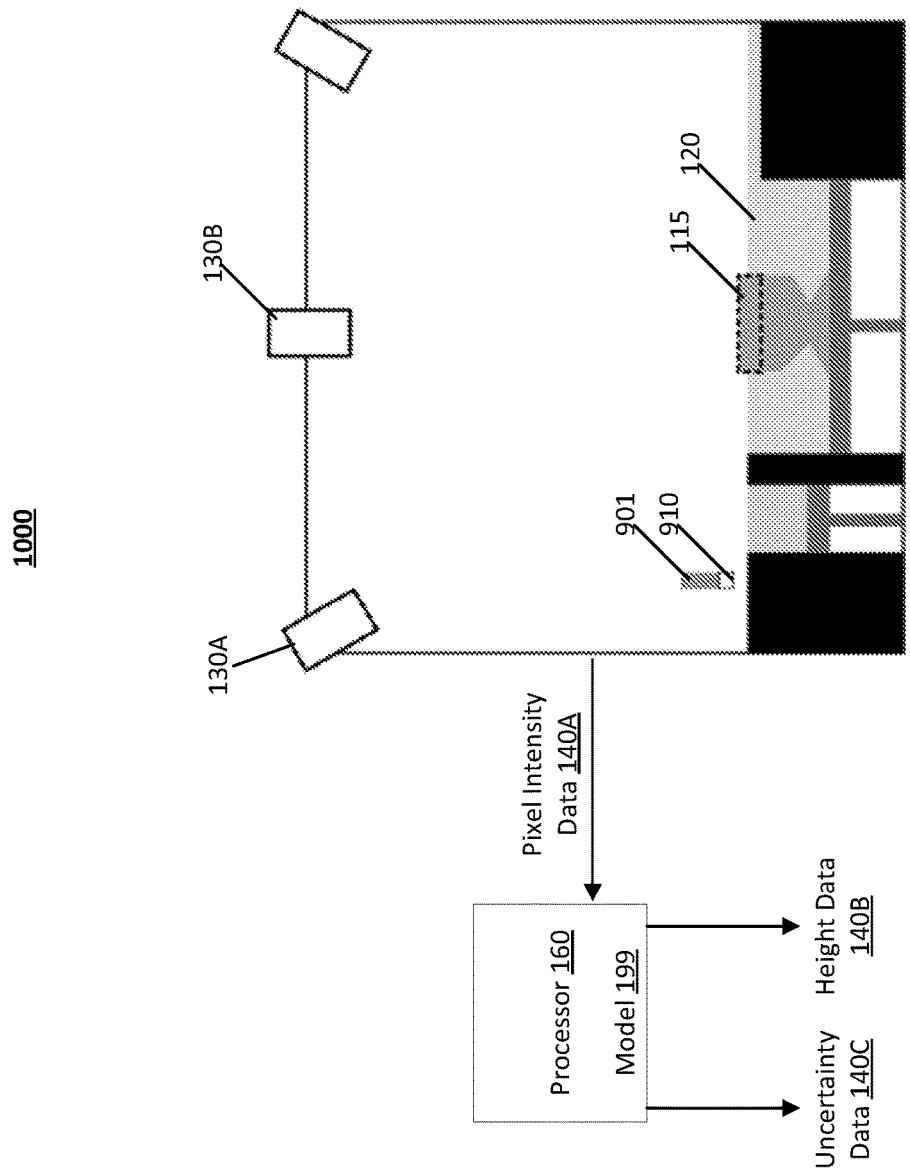
FIG. 10 depict an example of powder bed fusion including a contact scanner, in accordance with some example embodiments.

FIG. 10 depicts another example of an additive manufacturing system 1000, in accordance with some example embodiments. In the example of FIG. 10, a powder bed fusion technology is used as depicted. Like FIG. 1A, the recoater 901 may be used to apply the material, but the recoater 901 includes an optical contact sensor 910. This optical sensor may be used as a contact image scanner as noted above with respect to FIG. 8.

In some implementations, the processor 160 may perform one or more operations disclosed herein (e.g., process 200 and the like) in order to determine a height uncertainty based on a model, such as model 199.

Figure 11:
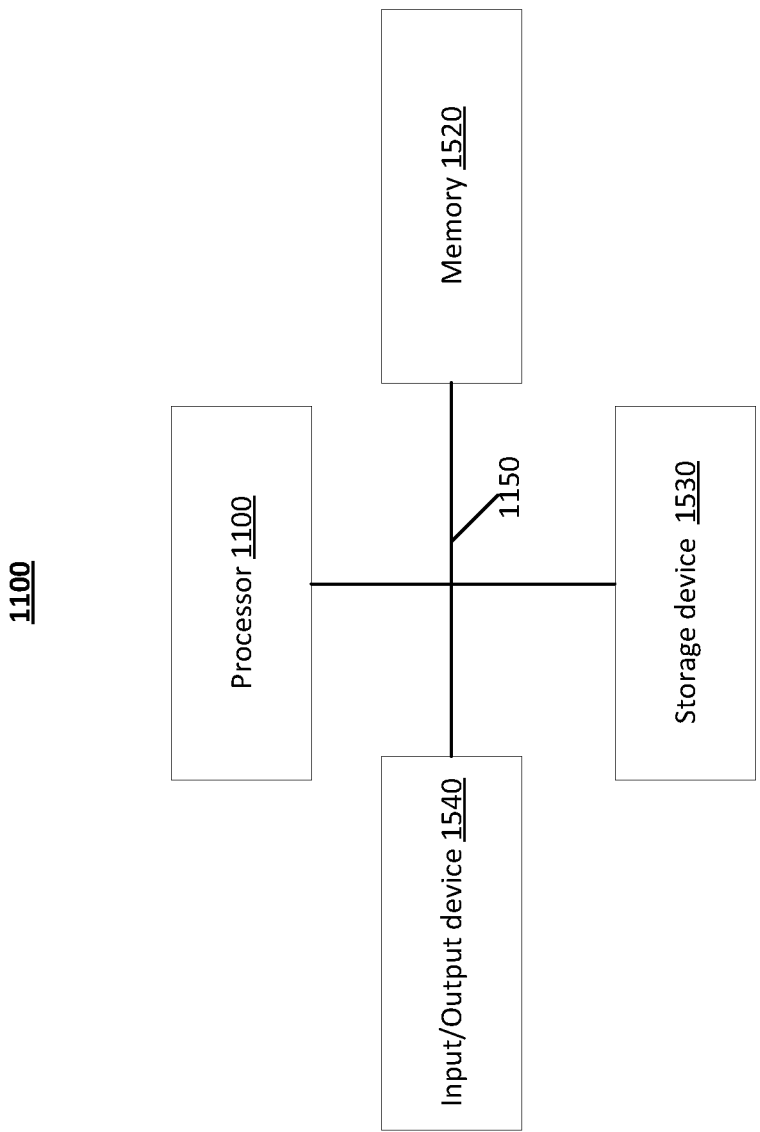
FIG. 11 depicts an example of a processor, in accordance with some example embodiments.

FIG. 11 depicts an example of a system 1100 including a processor 1110, a memory 1120, a storage device 1130, and an input/output device 1140. Each of the components 1110, 1120, 1130 and 1140 can be interconnected using a system bus 1150. The processor 1510 can be configured to process instructions for execution within the system 1100. In some implementations, the processor 1510 can be a single-threaded processor. In alternate implementations, the processor 1510 can be a multi-threaded processor. The processor 1510 can be further configured to process instructions stored in the memory 1520 or on the storage device 1530, including receiving or sending information through the input/output device 1540. The memory 1520 can store information within the system 1100. In some implementations, the memory 520 can be a computer-readable medium. In alternate implementations, the memory 1520 can be a volatile memory unit. In yet some implementations, the memory 1520 can be a non-volatile memory unit. The storage device 1530 can be capable of providing mass storage for the system 1100. In some implementations, the storage device 1530 can be a computer-readable medium. In alternate implementations, the storage device 1530 can be a floppy disk device, a hard disk device, an optical disk device, a tape device, non-volatile solid-state memory, or any other type of storage device. The input/output device 1540 can be configured to provide input/output operations for the system 500. In some implementations, the input/output device 1540 can include a keyboard and/or pointing device. In alternate implementations, the input/output device 1540 can include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer. Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description). The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

Derivation p, μ, and σ

Equation 10 below is the transfer function that transforms the noise statistics (epsilon_terms) into the phase noise term (kappa). Equation 10 may be determined based on the relationship between the measurement inputs (e.g., pixel intensity) and the measurement outputs (e.g., height values). The phi_c terms are the carrier phase, which is related to the projected fringes. Phi is the true phase value related to the height of the object at each specific point.

$$\kappa \approx \arctan\left(\frac{\frac{2}{N}\sum_{i=1}^{N}\sin\left(\frac{2\pi i}{N}+\phi_c\right)\bar{\epsilon}_{r,i}-\sin\left(\frac{2\pi i}{N}+\phi+\phi_c\right)\bar{\epsilon}_{o,i}}{1+\frac{2}{N}\sum_{i=1}^{N}\cos\left(\frac{2\pi i}{N}+\phi_c\right)\bar{\epsilon}_{r,i}+\cos\left(\frac{2\pi i}{N}+\phi+\phi_c\right)\bar{\epsilon}_{o,i}}\right). \quad (10)$$

To figure out how to model the probability of kappa, the statistics are defined based on Equation 10, and correlated noise structures are included in the model. The following assumptions are made: pixel intensity noise for the reference and the object images are each jointly normally distributed, allowing arbitrary image-to-image correlation (e.g., $\bar{\epsilon}_{r,i} \sim N(\mu_{r,i}, \sigma_{r,i}, \Sigma_{r,ij})$ and $\bar{\epsilon}_{o,i} \sim N(\mu_{o,i}, \sigma_{o,i}, \Sigma_{i,ij})$, i=1 ... N where μ is the pixel intensity noise mean), σ is the pixel intensity noise standard deviation, and Σ is the image-to-image pixel intensity noise correlation. Moreover, it is assumed that the reference and object images may be correlated with correlation matrix $\Sigma_{or,ij}$; in other words, this allows for the possibility that the ith object image noise may be correlated with the jth reference image noise (in addition to the initial assumption that individual reference and object images may be intra-correlated). Thus, a global correlation matrix $\Sigma_{ij}$ may be constructed as $$\Sigma_{ij} = \begin{bmatrix} \Sigma_{o,ij} & \Sigma_{or,ij} \\ \Sigma_{ro,ij} & \Sigma_{r,ij} \end{bmatrix}. \quad (11)$$

The upper left and lower right square sub-matrices describe the intra-image correlation structure in the object and reference images, respectively, while the upper right and lower left sub-matrices describe any correlation structure between object and reference images. The following expectation operations, where E[*] is the expectation operator, are defined as $$E[\bar{\epsilon}_{r,i}] = \mu_{r,i}$$

$$E[\bar{\epsilon}_{o,i}] = \mu_{o,i}$$

$$E[\bar{\epsilon}_{o,i}\bar{\epsilon}_{o,j}] = \mu_{o,i}\mu_{o,j} + \rho_{o,ij}\sigma_{o,i}\sigma_{o,j}$$

$$E[\bar{\epsilon}_{r,i}\bar{\epsilon}_{r,j}] = \mu_{r,i}\mu_{r,j} + \rho_{r,ij}\sigma_{r,i}\sigma_{r,j}$$

$$E[\bar{\epsilon}_{o,i}\bar{\epsilon}_{r,j}] = \mu_{o,i}\mu_{r,j} + \rho_{or,ij}\sigma_{o,i}\sigma_{r,j}, \quad (12)$$

where $\Sigma_{r,ij} = \rho_{r,ij}\sigma_{r,i}\sigma_{r,j}, \Sigma_{o,ij} = \rho_{o,ij}\sigma_{o,i}\sigma_{o,j}, \Sigma_{or,ij} = \rho_{or,ij}\sigma_{o,i}\sigma_{r,j}$, while p* is a correlation coefficient and σ* is a standard deviation. The rho, sigma, and mu terms here are all measured quantities of pixel intensity noise, captured over numerous captured images.

Next, the form of Equation 10 may be written as κ=arctan (Y/X) where the numerator Y and denominator X are given by $$Y = \frac{2}{N}\sum_{i=1}^{N}\sin\left(\frac{2\pi i}{N}+\phi_c\right)\bar{\epsilon}_{r,i} - \sin\left(\frac{2\pi i}{N}+\phi+\phi_c\right)\bar{\epsilon}_{o,i} \quad (13)$$

$$X = 1 + \frac{2}{N}\sum_{i=1}^{N}\cos\left(\frac{2\pi i}{N}+\phi_c\right)\bar{\epsilon}_{r,i} + \cos\left(\frac{2\pi i}{N}+\phi+\phi_c\right)\bar{\epsilon}_{o,i}.$$

$$\mu_Y = E[Y] \quad (14)$$

$$= \frac{2}{N}\sum_{i=1}^{N}\sin\left(\frac{2\pi i}{N}+\phi_c\right)E[\bar{\epsilon}_{r,i}] - \sin\left(\frac{2\pi i}{N}+\phi+\phi_c\right)E[\bar{\epsilon}_{o,i}]$$

-continued $$= \frac{2}{N}\sum_{i=1}^{N}\sin\left(\frac{2\pi i}{N}+\phi_c\right)\mu_{r,i} - \sin\left(\frac{2\pi i}{N}+\phi+\phi_c\right)\mu_{o,i}$$

$$\mu_X = E[X] \qquad (15)$$

$$= 1 + \frac{2}{N}\sum_{i=1}^{N}\cos\left(\frac{2\pi i}{N}+\phi_c\right)E[\bar{\varepsilon}_{r,i}] + \cos\left(\frac{2\pi i}{N}+\phi+\phi_c\right)E[\bar{\varepsilon}_{o,i}]$$

$$= 1 + \frac{2}{N}\sum_{i=1}^{N}\cos\left(\frac{2\pi i}{N}+\phi_c\right)\mu_{r,i} + \cos\left(\frac{2\pi i}{N}+\phi+\phi_c\right)\mu_{o,i}.$$

Similarly, the variances of Y and X, $\sigma_y^2 = E[y^2] - E^2[y]$ and $\sigma_x^2 = E[x^2] - E^2[X]$, are computed by taking appropriate expectations:

$$\sigma_Y^2 = \frac{4}{N^2}\sum_{i,j=1}^{N}\sin\left(\frac{2\pi i}{N}+\phi+\phi_c\right)\sin\left(\frac{2\pi i}{N}+\phi+\phi_c\right)E[\bar{\varepsilon}_{o,i}\bar{\varepsilon}_{o,j}] - \qquad (16)$$

$$2\sin\left(\frac{2\pi i}{N}+\phi+\phi_c\right)\sin\left(\frac{2\pi j}{N}+\phi_c\right)E[\bar{\varepsilon}_{o,i}\bar{\varepsilon}_{r,j}] +$$

$$\sin\left(\frac{2\pi i}{N}+\phi_c\right)\sin\left(\frac{2\pi j}{N}+\phi_c\right)E[\bar{\varepsilon}_{r,i}\bar{\varepsilon}_{r,j}] - \mu_Y^2 =$$

$$\frac{4}{N^2}\sum_{i,j=1}^{N}\sin\left(\frac{2\pi i}{N}+\phi+\phi_c\right)\sin\left(\frac{2\pi j}{N}+\phi+\phi_c\right)\rho_{o,ij}\sigma_{o,i}\sigma_{o,j} -$$

$$2\sin\left(\frac{2\pi i}{N}+\phi+\phi_c\right)\sin\left(\frac{2\pi j}{N}+\phi_c\right)\rho_{or,ij}\sigma_{o,i}\sigma_{r,j} +$$

$$\sin\left(\frac{2\pi i}{N}+\phi_c\right)\sin\left(\frac{2\pi j}{N}+\phi_c\right)\rho_{r,ij}\sigma_{r,i}\sigma_{r,j}.$$

The derivation of the terms E[Y2] and E2[Y] employed usage of a double sum across indices i, j in $\Sigma_{i,j=1}^N$ to indicate the product pf two series.

Similarly, $$\sigma_X^2 = \frac{4}{N^2}\sum_{i,j=1}^{N}\cos\left(\frac{2\pi i}{N}+\phi+\phi_c\right)\cos\left(\frac{2\pi j}{N}+\phi+\phi_c\right)\rho_{o,ij}\sigma_{o,i}\sigma_{o,j} + \qquad (17)$$

$$2\cos\left(\frac{2\pi i}{N}+\phi+\phi_c\right)\cos\left(\frac{2\pi j}{N}+\phi_c\right)\rho_{or,ij}\sigma_{o,i}\sigma_{r,j} +$$

$$\cos\left(\frac{2\pi i}{N}+\phi_c\right)\cos\left(\frac{2\pi j}{N}+\phi_c\right)\rho_{r,ij}\sigma_{r,i}\sigma_{r,j}.$$

Finally, since X and Y are generally correlated, the covariance cov [X, Y]=E[XY]-E[X] E[Y] as $$\text{cov}(X, Y) = \qquad (18)$$

$$-\frac{4}{N^2}\sum_{i,j=1}^{N}\sin\left(\frac{2\pi i}{N}+\phi+\phi_c\right)\cos\left(\frac{2\pi j}{N}+\phi+\phi_c\right)\rho_{o,ij}\sigma_{o,i}\sigma_{o,j} +$$

$$\sin\left(\frac{2\pi(i-j)}{N}+\phi\right)\rho_{or,ij}\sigma_{o,i}\sigma_{r,j} -$$

$$\sin\left(\frac{2\pi i}{N}+\phi_c\right)\cos\left(\frac{2\pi j}{N}+\phi_c\right)\rho_{r,ij}\sigma_{r,i}\sigma_{r,j}.$$

The covariance between X and Y is composed of contributions from possible intra-image correlation within the reference and object images ($P_{o,ij}$ and $P_{r,ij}$), as well as reference-to-object image correlation ($P_{or,ij}$). In general, all the order statistics of X and Y depend on input noise statistical parameters as well as the true phase $\phi$.

The X and Y are jointly normally distributed, with individual means µx and µy, variances $\sigma_x^2$ and $\sigma_y^2$, and correlation coefficient $\beta_{XY}$=cov (X, Y)/$\sqrt{\sigma_x\sigma_y}$, all given by Eqs. (14-18), such that their joint probability density function may be given by $$p(X, Y) = \qquad (19)$$

$$\frac{1}{2\pi\sigma_X\sigma_Y\sqrt{1-\rho_{XY}^2}}e^{\frac{-1}{2(1-\rho_{XY}^2)}\left(\frac{(X-\mu_X)^2}{\sigma_X^2}+\frac{(Y-\mu_Y)^2}{\sigma_Y^2}-\frac{2\rho_{XY}(X-\mu_X)(Y-\mu_Y)}{\sigma_X\sigma_Y}\right)}.$$

With the joint density for X and Y, the change-of-variables technique may be used to make a coordinate transformation X=X and K=arctan (Y/X) to obtain the probability density function of K explicitly as $$p(\kappa) = \int_{-\infty}^{\infty}\frac{p(X, Y)}{|\partial\kappa/\partial Y|}dX \qquad (20)$$

$$= \int_{-\infty}^{\infty}\frac{p(X, Y)}{|X/(X^2+Y^2)|}dX$$

$$= \int_{-\infty}^{\infty}p(X, X\tan\kappa)|X|\sec^2\kappa dX,$$

Since Y=X tan K. The integrand and integration range in Equation 20 require separation into two regions, one for the case X>0 (|K|<π/2) and for the case X<0 (π>|K|>π/2). Both integrations admit closed-form solutions, given by $$p(\kappa) = \frac{e^{-z_3}\sec^2\kappa\left(1+\sqrt{\pi}z_2 e^{z_2^2}(\text{erf}(z_2)\pm 1)\right)}{2\pi z_1\sqrt{1-\rho_{XY}^2}}, \qquad (21)$$

where $$z_1 = \frac{\sigma_Y^2 - 2\rho_{XY}\sigma_X\sigma_Y\tan\kappa + \sigma_X^2\tan^2\kappa}{\sigma_X\sigma_Y(1-\rho_{XY}^2)}, \qquad (22)$$

$$z_2 = \frac{\mu_Y\sigma_X(\rho_{XY}\sigma_Y - \sigma_X\tan\kappa) + \mu_X\sigma_Y(\sigma_X\rho_{XY}\tan\kappa - \sigma_Y)}{\sqrt{2}\sigma_X\sigma_Y\sqrt{1-\rho_{XY}^2}\sqrt{\sigma_Y^2 - 2\rho_{XY}\sigma_X\sigma_Y\tan\kappa + \sigma_X^2\tan^2\kappa}},$$

$$z_3 = \frac{\mu_Y^2\sigma_X^2 + \mu_X^2\sigma_Y^2 - 2\mu_X\mu_Y\sigma_X\sigma_Y\rho_{XY}}{2\sigma_X^2\sigma_Y^2(1-\rho_{XY}^2)}.$$

and erf(*) is the standard error function. The minus (−) sign in taken in Eq. (21) when |K|<π/2 (when X>0), while the plus (+) sign is taken when π>|K|>π/2 (when X<0).

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   at least one processor; and
   at least one memory including program code which when executed by the at least one processor causes operations comprising:
     capturing an image of at least a portion of a surface of an object;
     generating, from the captured image, pixel intensity data;
     in response to generating the pixel intensity data, determining, based on a height error model, at least one height measurement of the object and height error data, wherein the height error data indicates an uncertainty of the at least one height measurement of the object; and
     determining, based on the height error data, whether the object satisfies a threshold criteria for acceptance of the object, wherein determining whether the object satisfies the threshold criteria further comprises determining whether the object satisfies a threshold height.

2. The system of claim 1 further comprising:
   an image sensor configured to capture the image; and
   a light source configured to project structured light on to the surface of the object.

3. The system of claim 2, wherein the structured light comprises a Moiré pattern and/or a fringe pattern.

4. The system of claim 1, wherein the height error model is determined based on noise captured by the image associated with the pixel intensity data.

5. The system of claim 4, wherein the noise includes uncertainty caused by light projector gamma nonlinearity, light projector quantization, camera quantization, and/or pixel intensity noise caused by ambient light.

6. The system of claim 1, further comprising:
   in response to the at least one height measurement exceeding a threshold height, providing, based on the height error data indicating a threshold level of certainty, an indication to reject the object.

7. The system of claim 6, wherein the indication terminates an additive manufacturing process of the object.

8. The system of claim 6, wherein the indication triggers an alert at a user interface.

9. The system of claim 6, wherein the indication triggers an alert to dispose of, rather than reuse, material being used to build the object.

10. The system of claim 1, wherein the system comprises, or is comprised in, an additive manufacturing device making the object.

11. The system of claim 10, wherein after a layer of material is applied, the processor causes the capturing, the generating, the determining height error data, and/or determining whether the object satisfies the threshold criteria.

12. The system of claim 10, wherein the additive manufacturing device comprises powder fusion, binder jetting, and/or direct energy deposition.

13. The system of claim 1, further comprising:
   in response to the at least one height measurement being less than a threshold height, providing, based on the height error data indicating a threshold level of certainty, an indication to continue or restart additive manufacturing of the object.

14. The system of claim 1 further comprising:
   providing an aggregate layer height and an aggregate height error for a plurality of layers of material applied to the object.

15. The system of claim 1 further comprising:
   providing feedback to adjust one or more parameters of an additive manufacturing process of the object.

16. A method comprising:
    capturing an image of at least a portion of a surface of an object;
    generating, from the captured image, pixel intensity data;
    in response to generating the pixel intensity data, determining, based on a height error model, at least one height measurement of the object and height error data height error data, wherein the height error data indicates an uncertainty of the at least one height measurement of the object; and
    determining, based on the height error data, whether the object satisfies a threshold criteria for acceptance of the object, wherein determining whether the object satisfies the threshold criteria further comprises determining whether the object satisfies a threshold height.

17. The method of claim 16, further comprising:
    in response to the generating of the pixel intensity data, determining the at least one height measurement of the object, and wherein the determining whether the object satisfies the threshold criteria further comprises determining whether the object satisfies a threshold height.

18. The method of claim 16, further comprising:
    in response to the at least one height measurement exceeding a threshold height, providing, based on the height error data indicating a threshold level of certainty, an indication to reject the object.

19. A non-transitory computer-readable storage medium including program code, which when executed by at least one processor, causes operations comprising:
    capturing an image of at least a portion of a surface of an object;
    generating, from the captured image, pixel intensity data;
    in response to generating the pixel intensity data, determining, based on a height error model, at least one height measurement of the object and height error data, wherein the height error data indicates an uncertainty of at least one height measurement of the object; and
    determining, based on the height error data, whether the object satisfies a threshold criteria for acceptance of the object, wherein determining whether the object satisfies the threshold criteria further comprises determining whether the object satisfies a threshold height.

* * * * *